(12) United States Patent
Nagasaka et al.

(10) Patent No.: US 10,514,881 B2
(45) Date of Patent: Dec. 24, 2019

(54) INFORMATION PROCESSING DEVICE, INFORMATION PROCESSING METHOD, AND PROGRAM

(71) Applicant: SONY CORPORATION, Tokyo (JP)

(72) Inventors: Hideo Nagasaka, Kanagawa (JP); Shouichi Doi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/780,107

(22) PCT Filed: Nov. 7, 2016

(86) PCT No.: PCT/JP2016/082976
§ 371 (c)(1),
(2) Date: May 30, 2018

(87) PCT Pub. No.: WO2017/141502
PCT Pub. Date: Aug. 24, 2017

(65) Prior Publication Data
US 2018/0349084 A1    Dec. 6, 2018

(30) Foreign Application Priority Data
Feb. 18, 2016 (JP) .................... 2016-028539

(51) Int. Cl.
*G06F 3/16* (2006.01)
*G06F 17/27* (2006.01)
(Continued)

(52) U.S. Cl.
CPC .............. *G06F 3/16* (2013.01); *G06F 17/27* (2013.01); *G06F 17/2785* (2013.01); *G10L 15/10* (2013.01); *G10L 15/22* (2013.01)

(58) Field of Classification Search
CPC ........................................ G06F 3/16
(Continued)

(56) References Cited

U.S. PATENT DOCUMENTS

| 8,818,554 B2 * | 8/2014 | Lee ............. H04M 1/7253 700/250 |
| 9,098,606 B1 * | 8/2015 | Chau ............ G06F 16/9535 |

(Continued)

FOREIGN PATENT DOCUMENTS

| JP | 2005-011089 A | 1/2005 |
| JP | 2007-091209 A | 4/2007 |

(Continued)

OTHER PUBLICATIONS

Jeon et al. "An Intelligent Dialogue Agent for the IoT Home", published on Feb. 13, 2016 (Year: 2016).*

(Continued)

*Primary Examiner* — Reza Nabi
(74) *Attorney, Agent, or Firm* — Paratus Law Group, PLLC

(57) ABSTRACT

There is provided an information processing device to provide a technology capable of easily recording a program for obtaining an intention of a user from text data corresponding to dialogue using a natural language, the information processing device including: a text data analysis unit configured to analyze text data corresponding to dialogue using a natural language, and extract an event included in the text data and a process to be executed in accordance with the event; and a record control unit configured to record a correspondence relation between the event and the process on a recording medium as a program.

2 Claims, 32 Drawing Sheets

(51) Int. Cl.
*G10L 15/10* (2006.01)
*G10L 15/22* (2006.01)

(58) Field of Classification Search
USPC .......................................................... 715/727
See application file for complete search history.

(56) References Cited

U.S. PATENT DOCUMENTS

| | | | |
|---|---|---|---|
| 9,304,736 B1* | 4/2016 | Whiteley | G06Q 20/40145 |
| 9,418,658 B1* | 8/2016 | David | H04M 1/64 |
| 9,472,206 B2* | 10/2016 | Ady | G10L 25/48 |
| 9,864,576 B1* | 1/2018 | Liu | G06F 3/167 |
| 9,990,591 B2* | 6/2018 | Gelfenbeyn | G06N 3/006 |
| 10,108,612 B2* | 10/2018 | Lee | G06F 1/1626 |
| 10,147,441 B1* | 12/2018 | Pogue | G10L 25/00 |
| 2007/0055423 A1* | 3/2007 | Yoshida | B60R 11/0264 |
| | | | 701/36 |
| 2007/0265844 A1* | 11/2007 | Koyama | 704/231 |
| 2008/0048908 A1* | 2/2008 | Sato | B60R 16/0373 |
| | | | 342/200 |
| 2008/0228492 A1* | 9/2008 | Sato | G10L 15/26 |
| | | | 704/275 |
| 2009/0157404 A1* | 6/2009 | Brown | G10L 15/19 |
| | | | 704/257 |
| 2010/0268702 A1* | 10/2010 | Wissner | G06F 16/955 |
| | | | 707/711 |
| 2012/0016678 A1* | 1/2012 | Gruber | G10L 15/22 |
| | | | 704/275 |
| 2012/0203379 A1* | 8/2012 | Sloo | G05D 23/1902 |
| | | | 700/276 |
| 2012/0265528 A1* | 10/2012 | Gruber | G10L 15/18 |
| | | | 704/235 |
| 2013/0159270 A1* | 6/2013 | Urmy | G06Q 10/0631 |
| | | | 707/706 |
| 2014/0040748 A1* | 2/2014 | Lemay | G06F 3/167 |
| | | | 715/728 |
| 2015/0019220 A1* | 1/2015 | Talhami | G10L 15/063 |
| | | | 704/244 |
| 2016/0372116 A1* | 12/2016 | Summerfield | G10L 25/63 |
| 2017/0300831 A1* | 10/2017 | Gelfenbeyn | G06N 3/006 |
| 2018/0090132 A1* | 3/2018 | Ikeno | G10L 15/1815 |
| 2018/0090144 A1* | 3/2018 | Ikeno | G10L 13/08 |
| 2018/0152557 A1* | 5/2018 | White | H04M 3/527 |
| 2018/0225365 A1* | 8/2018 | Altaf | G06F 17/27 |
| 2018/0330589 A1* | 11/2018 | Horling | G08B 13/1672 |
| 2018/0336893 A1* | 11/2018 | Robinson | G10L 15/22 |
| 2019/0012198 A1* | 1/2019 | Ni | G06F 9/4843 |

FOREIGN PATENT DOCUMENTS

| | | |
|---|---|---|
| JP | 2007-156577 A | 6/2007 |
| JP | 2013-246536 A | 12/2013 |
| JP | 2014-222514 A | 11/2014 |
| JP | 2015-004754 A | 1/2015 |

OTHER PUBLICATIONS

Mirko77, a reply on discussion thread posted at https://community.spotify.com/t5/Android/Mobile-App-doesn-t-pause-music-on-incoming-call/td-p/786325 on May 12, 2014. (Year: 2014).*
Jan. 10, 2017, Written Opinion of the International Searching Authority for related PCT No. PCT/JP2016/082976.
Dec. 20, 2018, Korean Office Action issued for related KR Application No. 10-2018-7019389.
Jan. 29, 2019, European Search Report issued for related EP Application No. 16890639.4.
Jeon et al., An Intelligent Dialogue Agent for the IoT Home, The Workshops of the Thirtieth AAAI Conference on Artificial Intelligence, Feb. 13, 2016, pp. 35-40.
Mar. 27, 2019, Chinese Office Action issued for related CN Application No. 201680081571.X.
Apr. 29, 2019, Korean Office Action issued for related KR Application No. 10-2018-7019389.

* cited by examiner

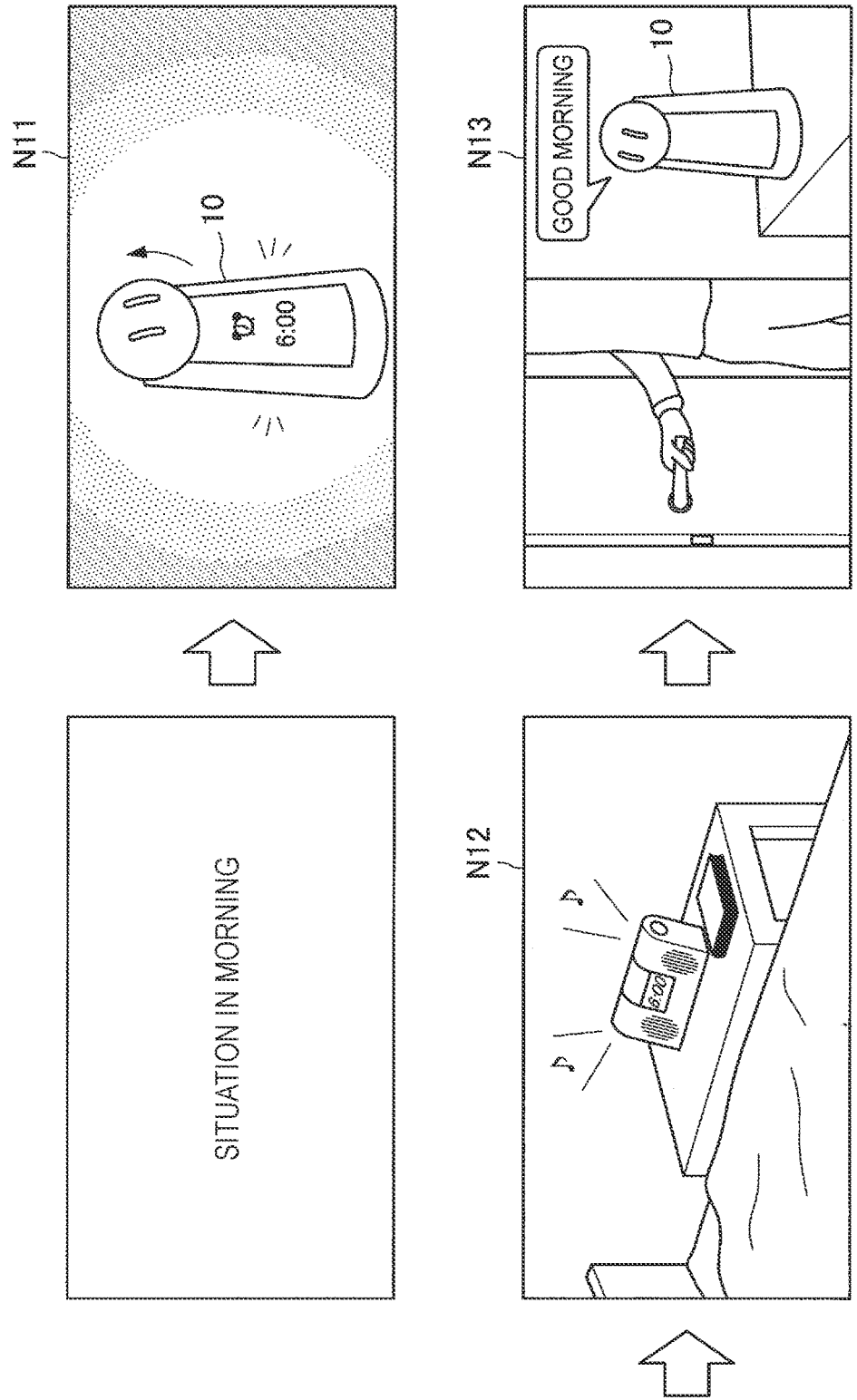

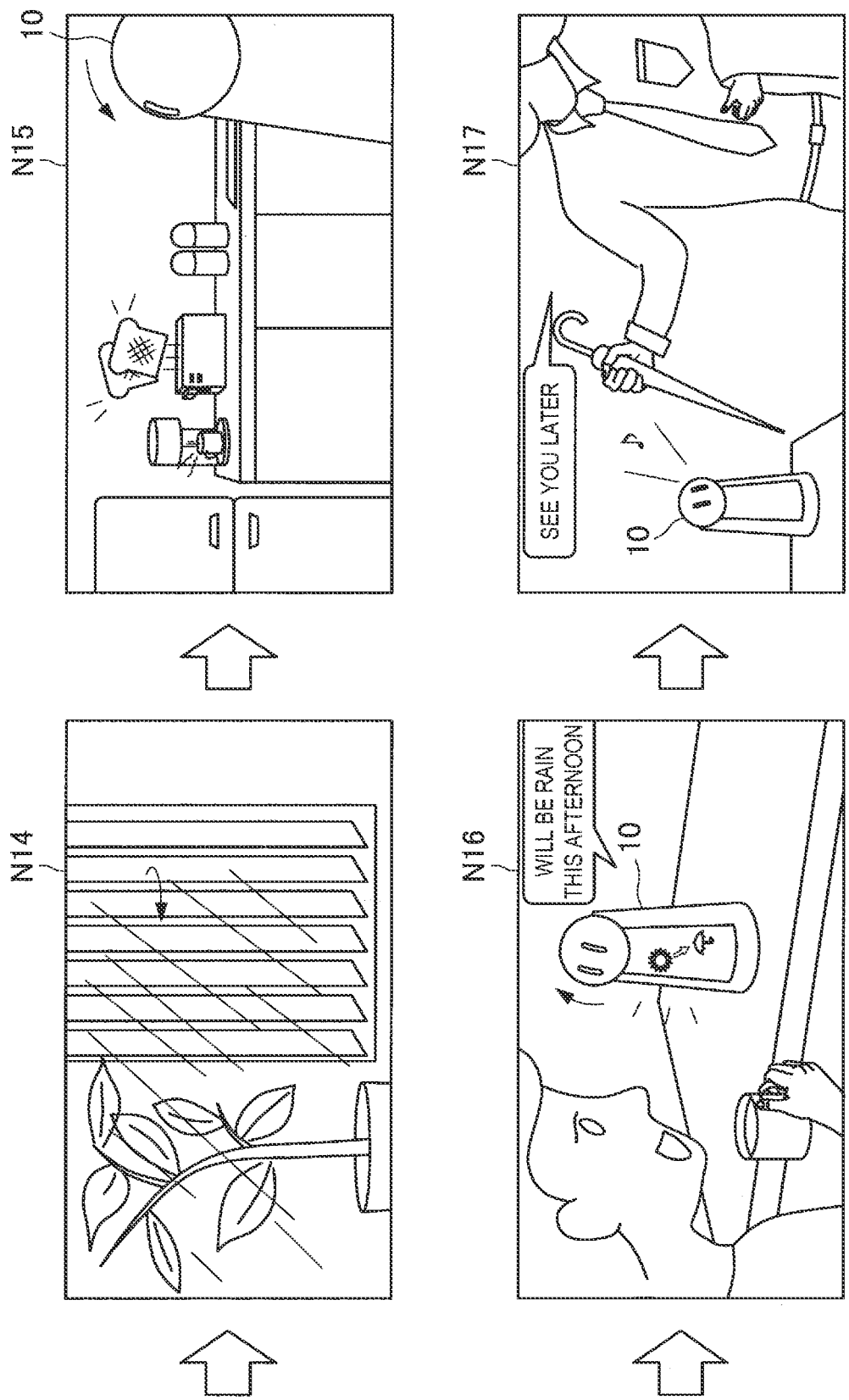

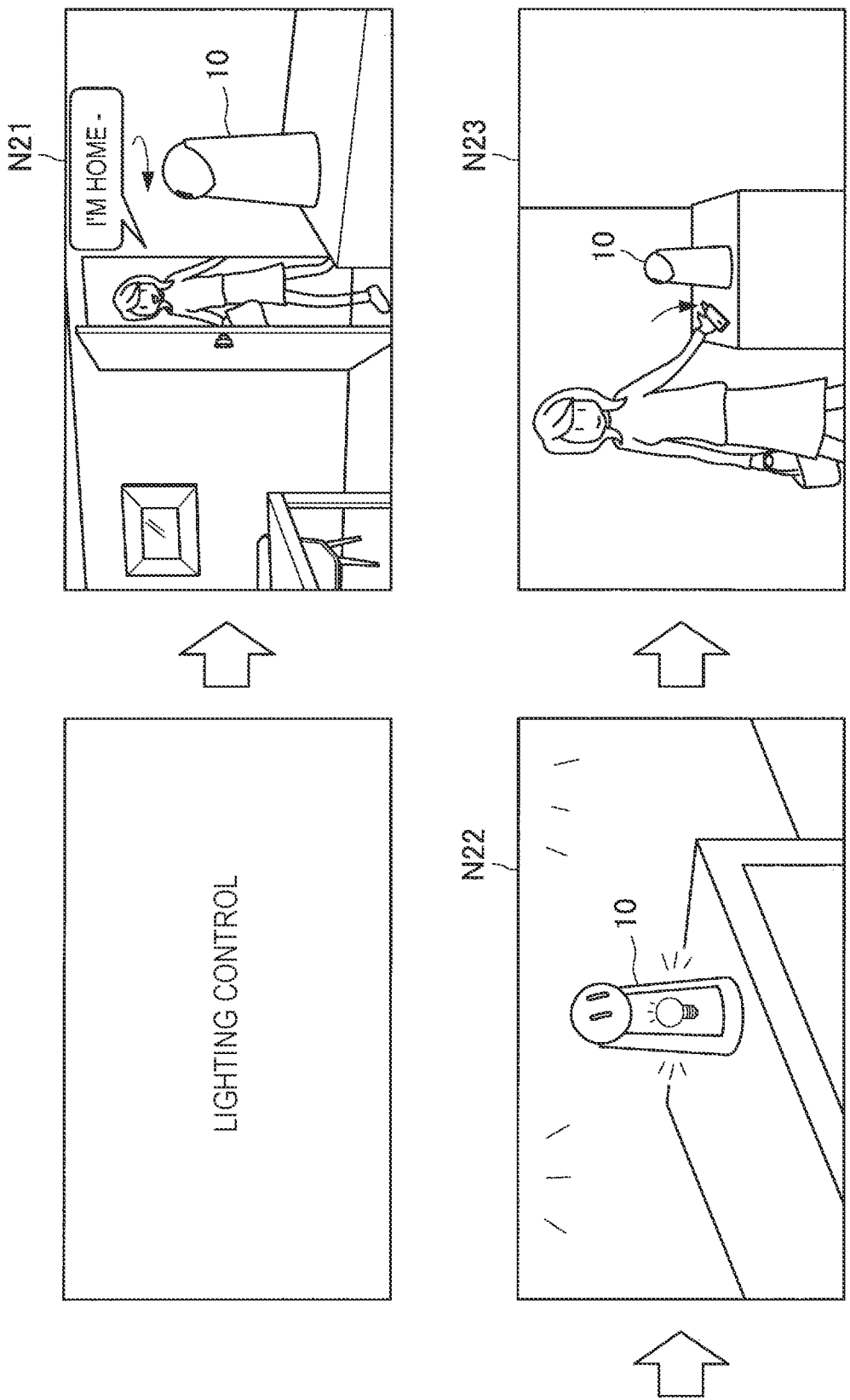

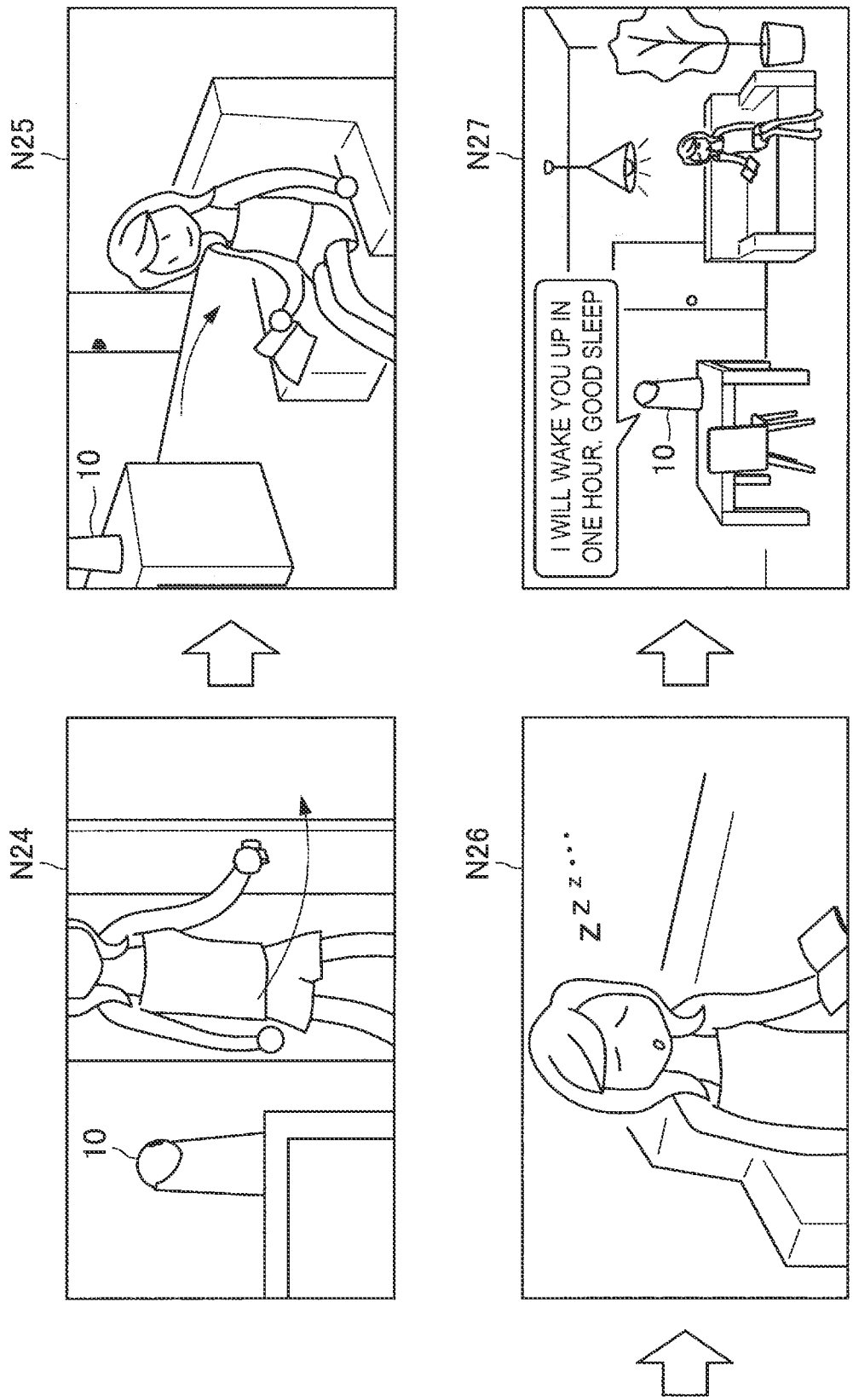

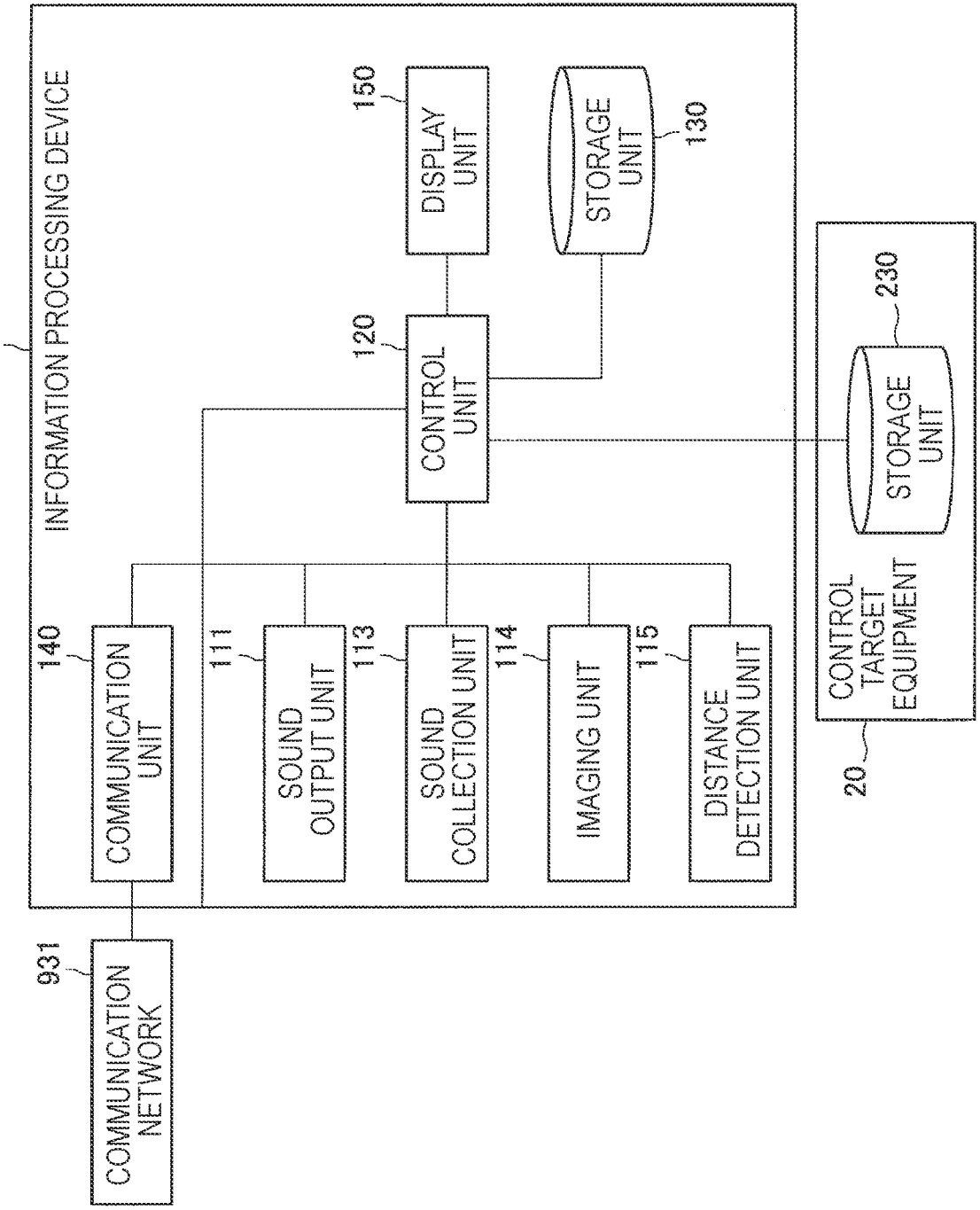

FIG. 12

| EVENT | PROCESS |
|---|---|
| ① GROUP OF RESPECTIVE SENSORS SUCH AS TEMPERATURE SENSOR, HUMIDIFY SENSOR, GYRO SENSOR, AND GPS SENSOR | ① START APP (E-MAIL, SMS, BROWSER, SPREADSHEET, GAME, RINGING ALARM ...) |
| ② USER BEHAVIOR (WHEN USER SAYS "HAPPY BIRTHDAY", WHEN USER GOES OUT, WHEN USER ENTERS AREA, WHEN USER GETS IN CAR, WHEN USER ARRIVES AT STATION, WHEN USER FEELS PAIN, WHEN HEART OF USER STOPS) | ② OPERATION OF EQUIPMENT (TURN ON AIR CONDITIONER, CLOSE CURTAINS, TURN ON TV, LOCK WITH KEY, TURN ON LIGHT, TURN OFF LIGHT, MAKE COFFEE, MUTE SOUND VOLUME, TURN ON PROJECTOR) |
| ③ START OR END OF PROCESS OF EQUIPMENT | ③ ACQUIRE INFORMATION/PRESENT INFORMATION (NEWS, TWEET, MAP, FINANCE) |
| ④ EQUIPMENT STATE (BATTERY, MALFUNCTION, ERROR STATE) | ④ NOTIFICATION (CALL POLICE, CALL AMBULANCE, CONTACT FAMILY, MAKE PHONE CALL TO FRIEND) |
| ④ START OR END OF PROCESS OF APP (WHEN TURNING ON AIR CONDITIONER, WHEN RECEIVING PHONE CALL, WHEN CLOSING DOOR) | ⑤ OPERATE MEDIUM (PLAY MUSIC, PLAY VIDEO, TAKE PHOTO, TAKE VIDEO) |
| ⑤ ENVIRONMENT INFORMATION (WHEN IT STARTS RAINING, WHEN TYPHOON COMES, WHEN MR. SUZUKI COMES, WHEN RECEIVING DELIVERY, WHEN CAT SAYS MEW, WHEN INFLUENZA IS SPREAD, IN CASE OF SHORTAGE IN ELECTRIC POWER, WHEN FAUCET IS BROKEN, WHEN EXPIRATION DATE COMES, WHEN BIRTHDAY COMES) | |

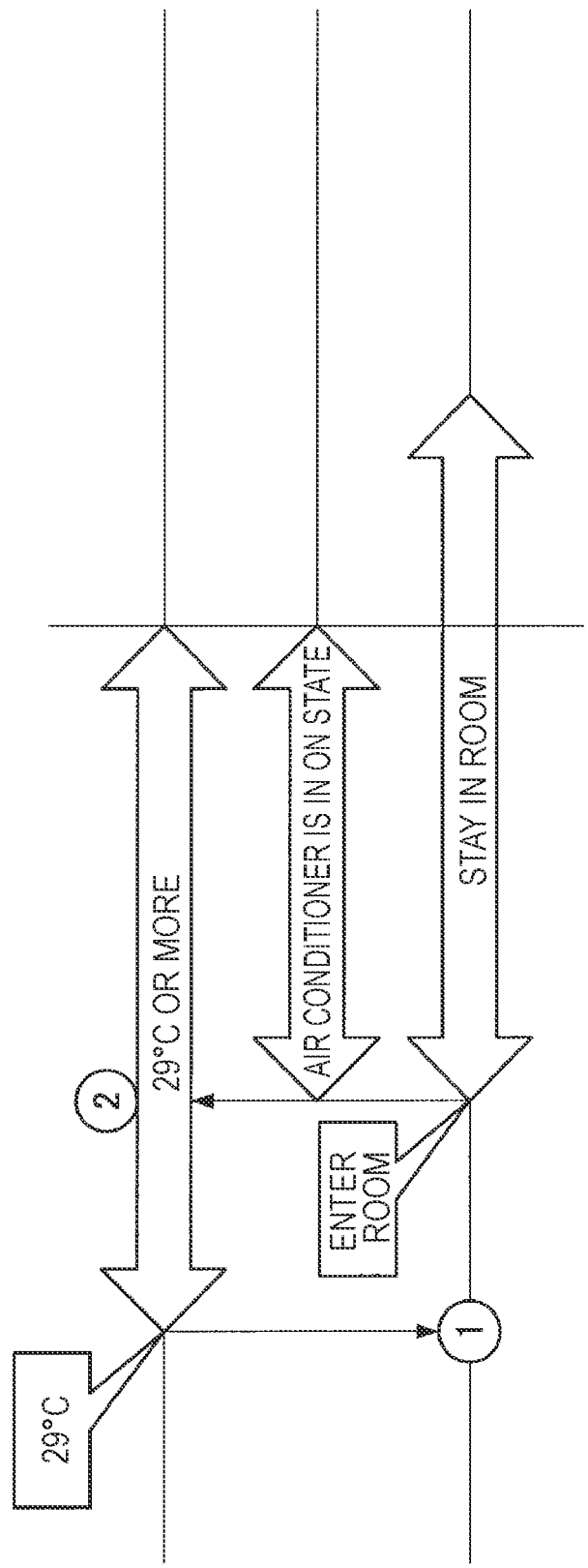

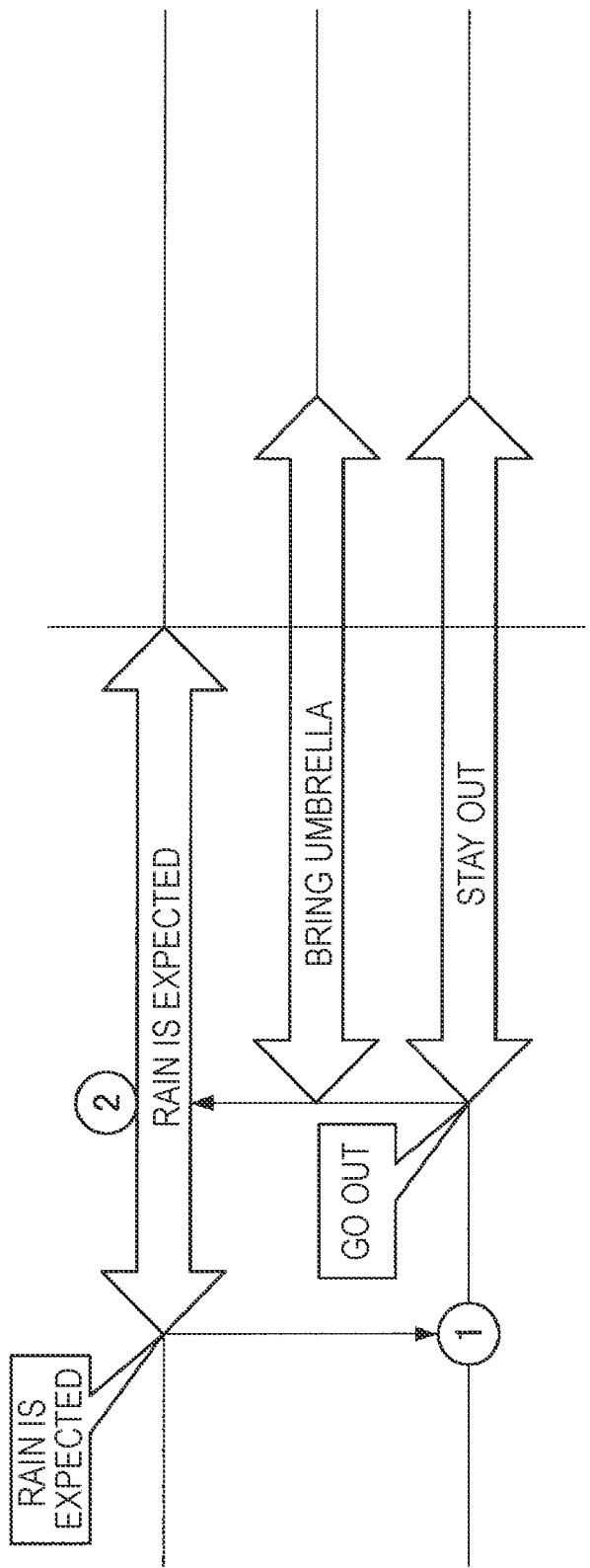

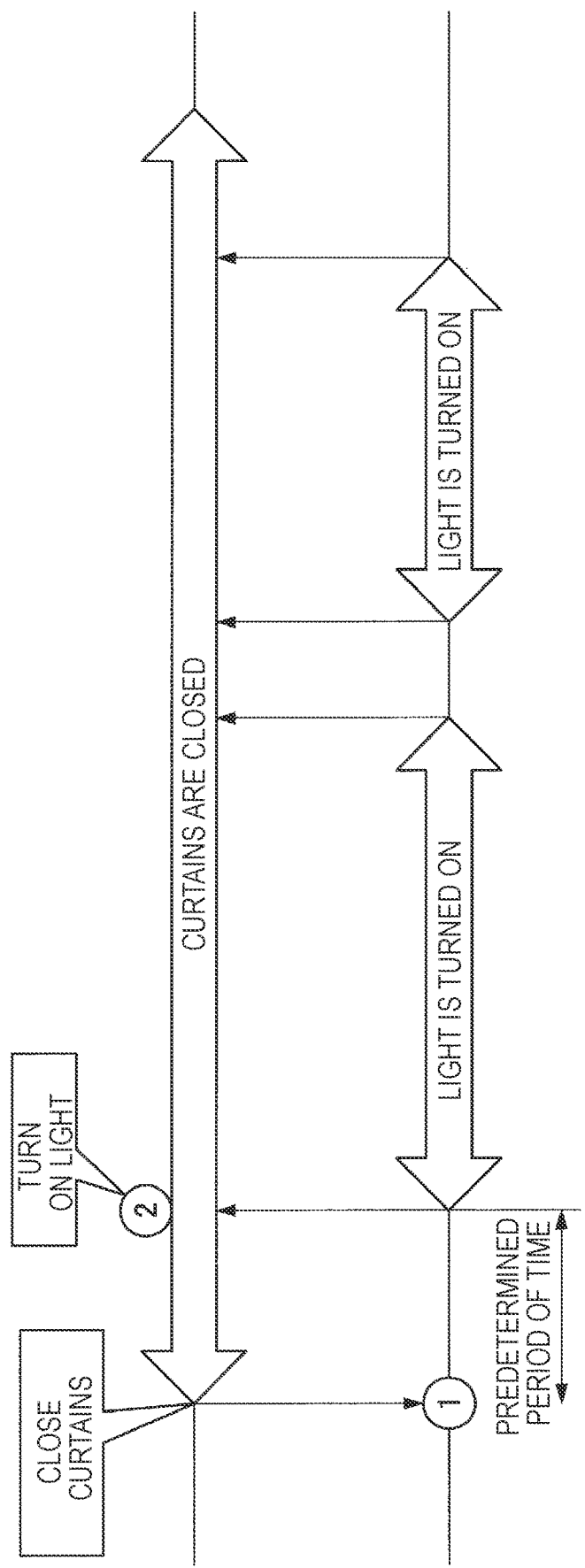

ID
INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2016/082976 (filed on Nov. 7, 2016) under 35 U.S.C. § 371, which claims priority to Japanese Patent Application No. 2016-028539 (filed on Feb. 18, 2016), which are all hereby incorporated by reference in their entirety.

TECHNICAL FIELD

The present disclosure relates to an information processing device, an information processing method, and a program.

BACKGROUND ART

In recent years, computers configured to analyze text data corresponding to dialogue using a natural language in accordance with a pre-registered program and operate in accordance with an intention of a user obtained by analyzing the text data, are disclosed (for example, see Patent Literature 1).

CITATION LIST

Patent Literature

Patent Literature 1: JP 2014-222514A

DISCLOSURE OF INVENTION

Technical Problem

However, it is desired to provide a technology capable of easily recording a program for obtaining an intention of a user from text data corresponding to dialogue using a natural language.

Solution to Problem

According to the present disclosure, there is provided an information processing device including: a text data analysis unit configured to analyze text data corresponding to dialogue using a natural language, and extract an event included in the text data and a process to be executed in accordance with the event; and a record control unit configured to record a correspondence relation between the event and the process on a recording medium as a program.

According to the present disclosure, there is provided an information processing method including: by a processor, analyzing text data corresponding to dialogue using a natural language, and extracting an event included in the text data and a process to be executed in accordance with the event; and recording a correspondence relation between the event and the process on a recording medium as a program.

According to the present disclosure, there is provided a program causing a computer to function as an information processing device including a text data analysis unit configured to analyze text data corresponding to dialogue using a natural language, and extract an event included in the text data and a process to be executed in accordance with the event, and a record control unit configured to record a correspondence relation between the event and the process on a recording medium as a program.

Advantageous Effects of Invention

As described above, according to the present disclosure, it is possible to provide the technology capable of easily recording a program for obtaining an intention of a user from text data corresponding to dialogue using a natural language. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1A is a diagram illustrating an example of functions provided by an information processing device according to the present embodiment.

FIG. 1B is a diagram illustrating the example of the functions provided by the information processing device according to the present embodiment.

FIG. 2A is a diagram illustrating another example of the functions provided by the information processing device.

FIG. 2B is a diagram illustrating the another example of the functions provided by the information processing device.

FIG. 3 is a diagram illustrating a functional configuration of the information processing device.

FIG. 12 is a diagram illustrating an example of respective types of events and processes.

FIG. 13 is a diagram illustrating an example of a process executed when events occur and conditions are satisfied.

FIG. 14 is a diagram illustrating an example of a process executed when events occur and conditions are satisfied.

FIG. 15 is a diagram illustrating an example in which a correspondence relation between events and processes is recognized on the basis of a user behavior analysis result.

MODE(S) FOR CARRYING OUT THE INVENTION

Figure 4:
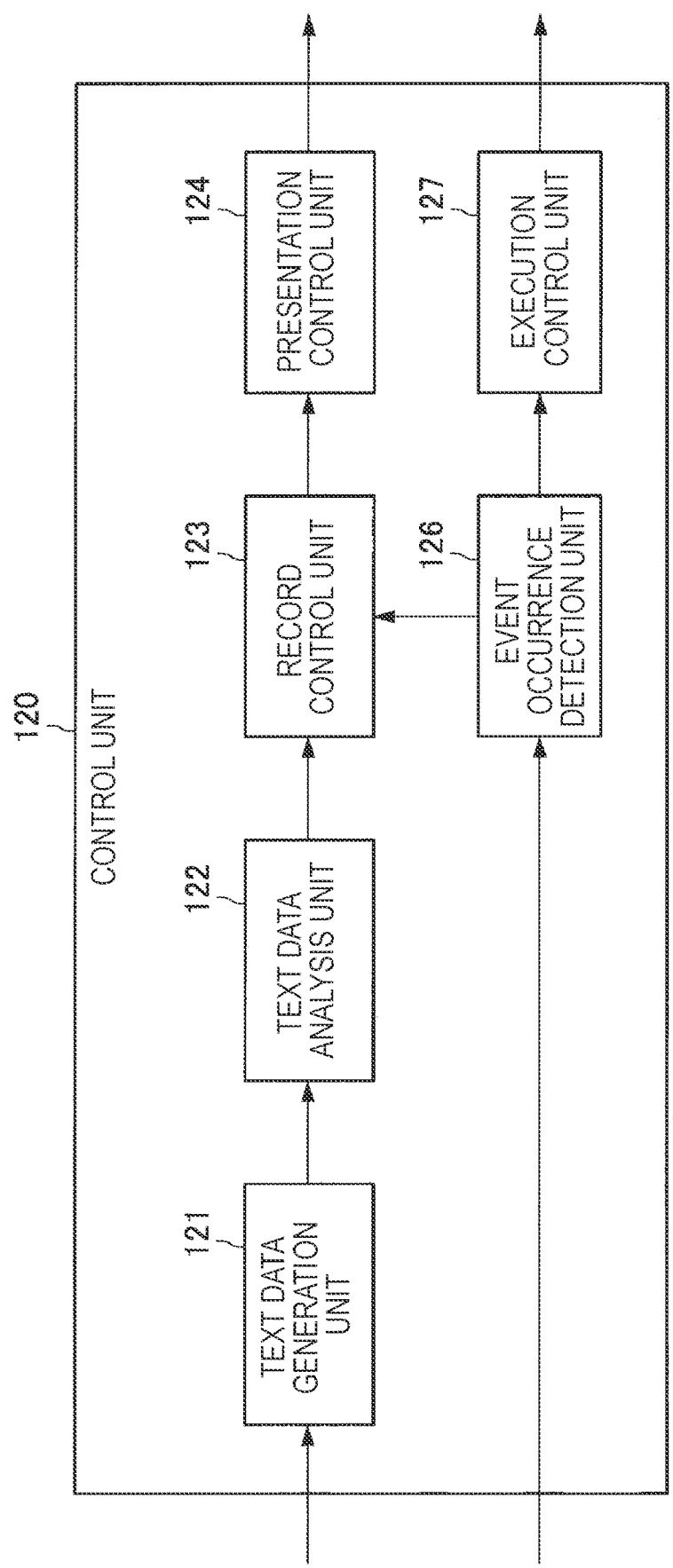
FIG. 4 is a diagram illustrating a detailed configuration example of a control unit.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, in this description and the drawings, a plurality of structural elements that have substantially the same function and structure are sometimes distinguished from each other using different numerals after the same reference signs. However, when there is no need in particular to distinguish structural elements that have substantially the same function and structure, the same reference sign alone is attached.

Note that, the description is given in the following order.
1. Embodiment of present disclosure
1.1 Overview
1.2. Functional configuration example
1.3. Details of functions
1.4. Hardware configuration example
2. Conclusion

1. EMBODIMENT OF PRESENT DISCLOSURE

[1.1 Overview]

First, with reference to drawings, an overview of an information processing device according to an embodiment of the present disclosure will be described. Note that, in the present specification, it is assumed that an information processing device functions as an agent. Here, the agent is a device configured to autonomously determine an intention of a user by interpreting a request input by the user, and control execution of a process based on the intention of the user. Hereinbelow, it is assumed that the information processing device is a robot, and sometimes the information processing device is referred to as the agent.

FIG. 1A and FIG. 1B are diagrams illustrating an example of functions provided by the information processing device according to the present embodiment. As illustrated in FIG. 1A, when a current time becomes a wake-up time that is registered in advance (6:00 a.m. in the example illustrated in FIG. 1A), an information processing device 10 placed on a shelf in a living room tilts its head such that its eyes faces upward, gradually light its eyes, and displays the current time (scene N11). In addition, a clock in a user's bedroom outputs a predetermined piece of music when the current time becomes the wake-up time (scene N12).

Next, when it is detected that the user gets out of the bedroom and comes into the living room, the information processing device 10 outputs a morning greeting by voice ("GOOD MORNING" in the example illustrated in FIG. 1A), and moves its eyes toward a window blind by rotating on the placement surface (scene N13). Next, as illustrated in FIG. 1B, the information processing device 10 controls the window blind such that the window blind opens (scene S14). In addition, when pieces of toast and a cup of coffee are prepared in a kitchen, the information processing device 10 moves its eyes toward the kitchen by rotating on the placement surface (scene N15).

Next, the information processing device 10 acquires a weather forecast, outputs the acquired weather forecast ("WILL BE PAIN THIS AFTERNOON" in the example illustrated in FIG. 1B) by voice, and displays an icon indicating the acquired weather forecast (scene N16). At this time, the information processing device 10 tilts its head such that it eyes faces the user. Next, when the user speaks a stock phrase said by a person leaving ("SEE YOU LATER" in the example illustrated in FIG. 13) by voice, the information processing device 10 outputs a similar stock phrase by voice, and follows the user with its eyes (scene N17).

Figure 23:
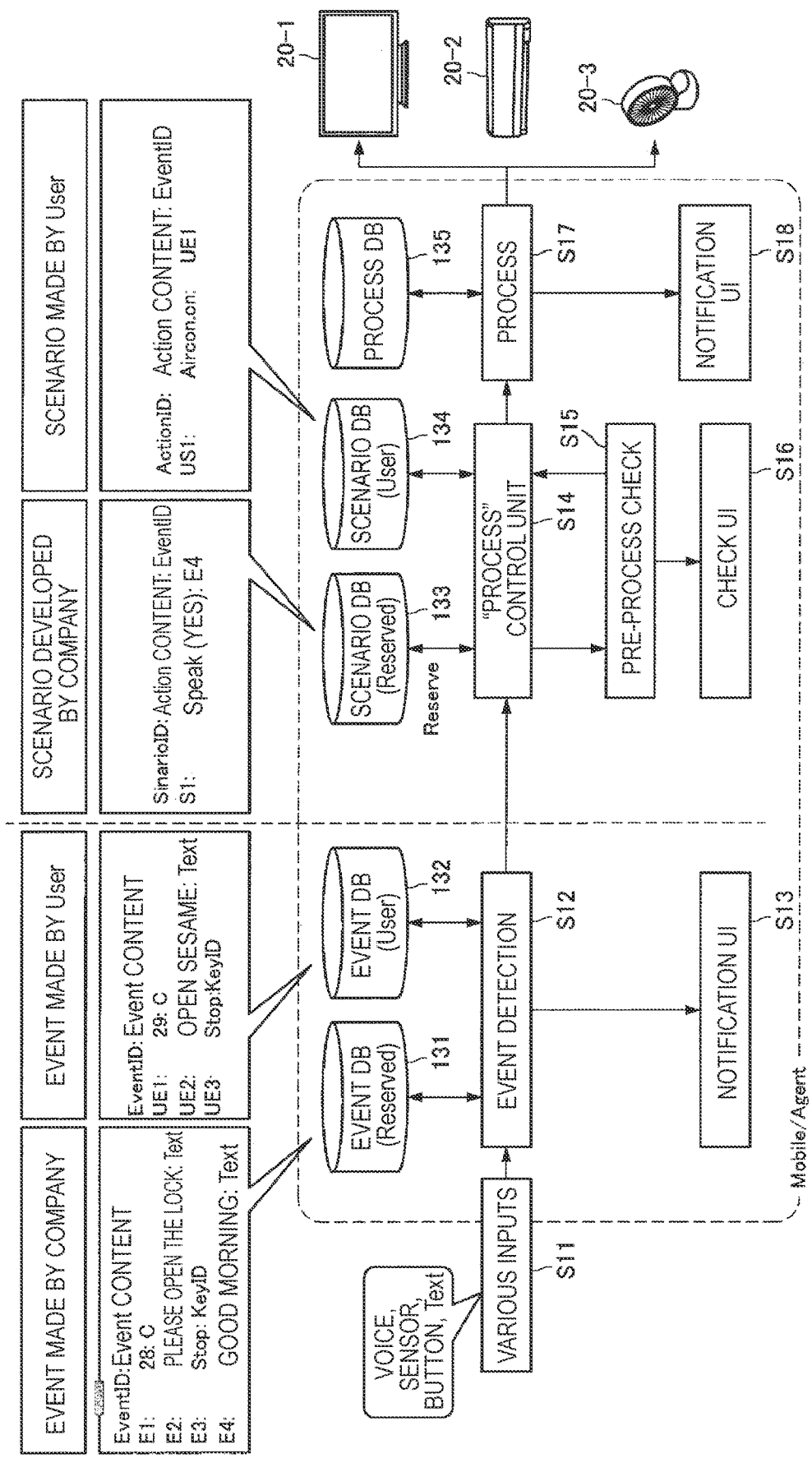
FIG. 23 is a diagram illustrating a second example of operation at the time when an event occurs.
Figure 24:
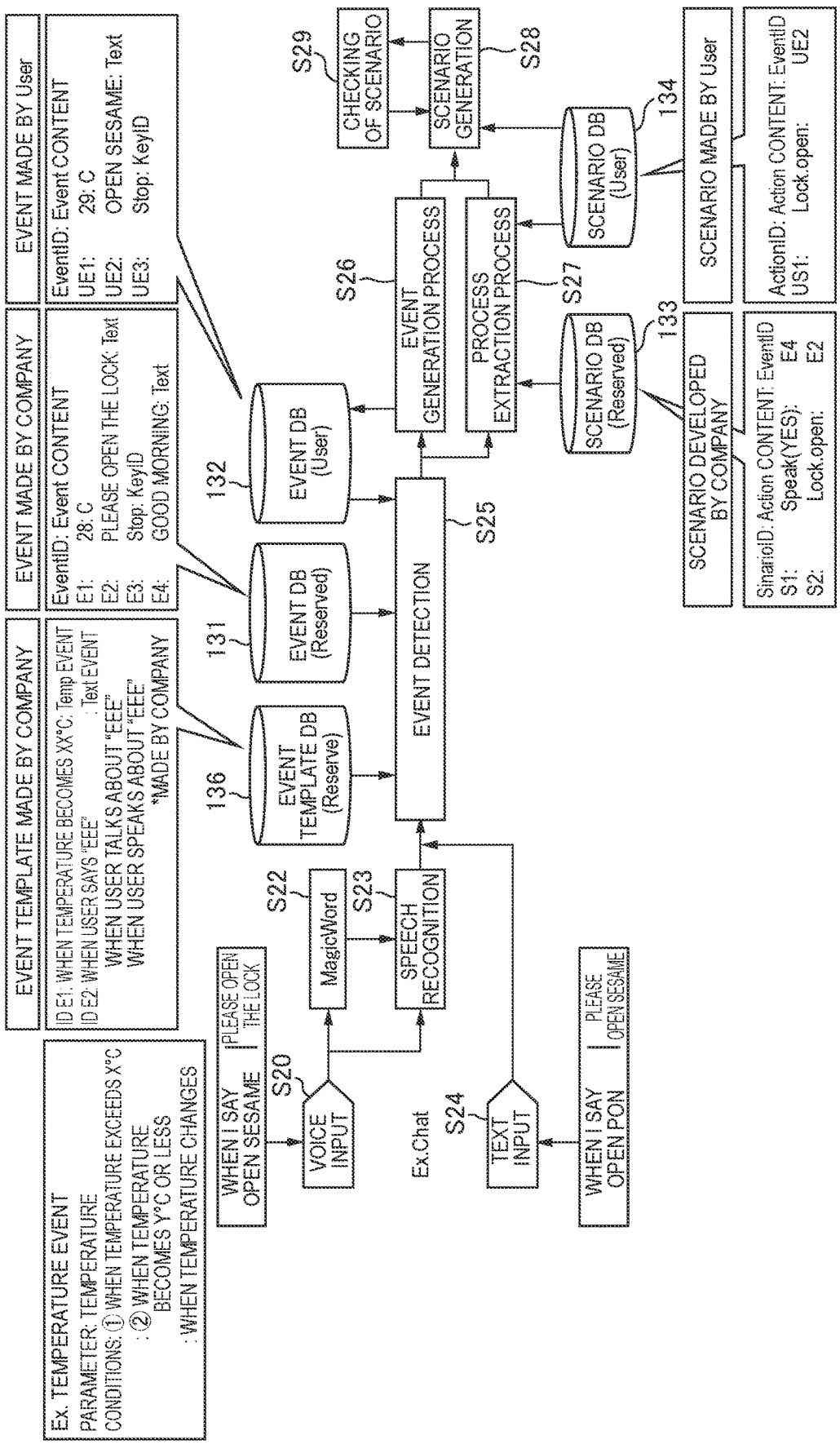
FIG. 24 is a diagram illustrating a first example of operation at the time of program registration.

FIG. 2A and FIG. 23 are diagrams illustrating another example of functions provided by the information processing device 10. As illustrated in FIG. 24, when it is detected that a user comes home and speaks a stock phrase said by a person coming back home (I'M HOME" in the example illustrated in FIG. 2A) by voice, the information processing device 10 placed on a shelf in a living room moves its eyes toward the user by rotating on the placement surface (scene N21). In addition, the information processing device 10 turns on a light and displays an icon indicating that the light is turned on (scene N22).

Next, the information processing device 10 follows the user with its eyes by rotating on the placement surface in accordance with movement of the user (scene N2.3 and scene N24). Subsequently, the user sits on a sofa (scene N25) and then fall into a sleep (scene N26). When it is detected that the user is sleeping on the basis of a captured image, the information processing device 10 automatically turns off the light and outputs a voice indicating that the information processing device 10 will output an alarm sound after a predetermined period of time ("I WILL WAKE YOU UP IN ONE HOUR. GOOD SLEEP" in the example illustrated in FIG. 2B) (scene N27).

[1.2. Functional Configuration Example]

Next, a functional configuration example of the information processing device 10 will be described. FIG. 3 is a diagram illustrating the functional configuration example of the information processing device 10. As illustrated in FIG. 3, the information processing device 10 includes a sound output unit 111, a sound collection unit 113, an imaging unit 114, a distance detection unit 115, a control unit 120, a storage unit 130, a communication unit 140, and a display unit 150. The information processing device 10 and control target equipment 20 are capable of communicating with each other via a network (such as a wireless local area network (LAN) or the like). In addition, the information processing device 10 is connected with a communication network 931. For example, the communication network 931 includes the Internet.

The control target equipment 20 is equipment capable of accepting a command from the information processing device 10 and executing the command. Here, the type of the control target equipment 20 is not specifically limited. For example, the control target equipment 20 may be a television device, a recorder, or an air-conditioning equipment (hereinafter, also referred to as an air conditioner), a coffeemaker, or a light. In addition, as illustrated in FIG. 3, the control target equipment 20 may include a storage unit 230. The storage unit 230 may be implemented by, for example, a magnetic storage device, a semiconductor storage device, an optical storage device, or a magneto-optical storage device.

The sound output unit 111 has a function of outputting sound. For example, the sound output unit 111 includes a speaker. The sound is output through the speaker. The number of speakers included in the sound output unit 111 is not specifically limited as long as the number of speakers is one or more. In addition, positions of the one or more speakers included in the sound output unit 111 are not specifically limited. Note that, the sound output unit 111 may include a sound output device other than the speaker (such as earphones or headset) as long as the device has a sound outputting function.

The sound collection unit 113 has a function of acquiring sound through sound collection. For example, the sound collection unit 113 includes a Microphone, and the sound is collected through the microphone. The number of microphones included in the sound collection unit 113 is not specifically limited as long as the number of microphones is one or more. In addition, positions of the one or more microphones included in the sound collection unit 113 are not specifically limited. Note that, the sound collection unit 113 may include a sound collection device other than the microphone as long as the device has a sound information collection function.

The imaging unit 114 has a function of inputting an image through image capturing. For example, the imaging unit 114 includes a camera, and an image captured by the camera is input. The number of cameras included in the imaging unit 114 is not specifically limited as long as the number of cameras is one or more. In addition, positions of the one or more cameras included in the imaging unit 114 are not specifically limited. For example, the one or more cameras may include a monocular camera, or may include a stereo camera.

The distance detection unit 115 has a function of detecting a distance to a user. For example, the distance detection unit 115 includes a ranging sensor, and acquires a distance to a user detected by the ranging sensor. A position of the ranging sensor is not specifically limited. In addition, the type of the ranging sensor is not specifically limited. For example, the distance sensor may be an infrared distance sensor or may be an ultrasonic distance sensor.

The communication unit 140 has functions of acquiring data from a server (not illustrated) connected with the communication network 931 via the communication network 931 and writing the data into the server. For example, the communication unit 140 is implemented by a communication interface. Note that, with regard to the communication unit 140, the number of the servers connected with the communication network 931 may be one or more.

The storage unit 130 is a recording medium configured to store programs to be executed by the control unit 120 and store data necessary for executing the programs. In addition, the storage unit 130 temporarily stores data for computation to be performed by the control unit 120. The storage unit 130 is implemented by, for example, a magnetic storage device, a semiconductor storage device, an optical storage device, or a magneto-optical storage device.

The display unit 150 has a function of displaying various kinds of screens. In this embodiment, it is mainly assumed that the display unit 120 is a projector. However, the type of the display unit 150 is not limited. For example, the display unit 150 may be a liquid crystal display or an organic electro-luminescence (EL) display as long as the display unit 150 is a display capable of displaying screens that are visible by users. In addition, an example in which the display unit 150 displays a screen at a relatively high position (such as a wall) or at a relatively low position (such as a body of the agent or a place near hands of a user) will be described in the embodiment. However, the position at which the display unit 150 displays a screen is not limited.

The control unit 120 controls the respective units in the information processing device 10. FIG. 4 is a diagram illustrating a detailed configuration example of the control unit 120. As illustrated in FIG. 4, the control unit 120 includes a text data generation unit 121, a text data analysis unit 122, a record control unit 123, a presentation control unit 124, an event occurrence detection unit 126, and an execution control unit 127. Details of these functional blocks will be described later. Note that, for example, the control unit 120 may be implemented by a central processing unit (CPU) or the like. In the case where the control unit 120 is implemented by a processing device such as the CPU, the processing device may be implemented by an electronic circuit.

Note that, hereinafter, the wording "voice" (or "speech") and the wording "sound" are used differently. Specifically, with regard to sound collected by the sound collection unit 113, the "voice" and the "speech" mainly means speech from a user, and the "sound" means both speech from a user and sound made by stuffs.

The functional configuration example of the information processing device 10 according to the embodiment has been described above.

[1.3. Details of Functions]

Next, details of the functions of the information processing device 10 will be described. Here, computers configured to analyze text data corresponding to dialogue using a natural language in accordance with a pre-registered program and operate in accordance with an intention of a user obtained by analyzing the text data, are disclosed. However, in general, it is difficult to record a program for obtaining an intention of a user from text data corresponding to dialogue using a natural language.

For example, there are various requests from a user such as "please turn on the air conditioner", "please turn on the air conditioner when (temperature) becomes 29° C.", and "please turn on the air conditioner and turn on the air circulator fan when (temperature) becomes 29° C.". Therefore, it is difficult to previously record exhaustive programs that match requests from users. In addition, it is also difficult for a provider of the information processing device 10 to create a program for executing a new process every time the new process becomes executable.

Therefore, the present embodiment mainly provides a technology capable of easily recording a program for obtaining an intention of a user from text data corresponding to dialogue using a natural language. Specifically, with regard to the above-described user request example "please turn on the air conditioner when (temperature) becomes 29° C.", the user request is divided into an event in which "(temperature) becomes 29° C." and a process of "turning on the air conditioner".

Therefore, in the present embodiment, the text data analysis unit 122 analyzes text data corresponding to dialogue using a natural language, and extracts an event included in the text data and a process to be executed in accordance with the event. Next, the record control unit 123 records a correspondence relation between the event and the process on the storage unit 130 as a program. According to the configuration, it is possible to easily record a program for obtaining an intention of a user from the text data corresponding to the dialogue using the natural language. In addition, as long as a process and an event are prepared in advance as elements, a program using the elements is automatically generated by a user. Therefore, it is possible to reduce a burden on the provider of the information processing device 10.

After recording the correspondence relation between the events and the processes on the storage unit 130 as a program in the above-described way, the event occurrence detection unit 126 detects occurrence of the event. Next, in the case where occurrence of the event is detected by the event occurrence detection unit 126, in the case where a program describing the detected event is recorded on the storage unit 130, the execution control unit 127 controls execution of a process described in the program. As described above, once the program is recorded, the process is automatically executed in response to occurrence of the event. Therefore, the user does not have to speak with every execution of the process.

Here, any way can be used for acquiring text data corresponding to dialogue using a natural language. For example, the text data generation unit 121 may perform a speech recognition process on a voice corrected by the sound collection unit 113, and may acquire a voice of a user as text data through the speech recognition process. Alternatively, it is also possible to obtain text data directly input by a user through a chat message.

In addition, any way can be used for extracting the event and the process. For example, the text data analysis unit 122 may extract the event and the process on the basis of prescribed information (for example, with reference to the events and processes that are recorded in advance on the storage unit 130). More specifically, in the case Where text data includes an event that is identical to the event recorded in advance on the storage unit 130, the text data analysis unit 122 extracts the event from the text data. In a similar way, in the case where text data includes a process that is identical to the process recorded in advance on the storage unit 130, the text data analysis unit 122 extracts the process from the text data.

Alternatively, the text data analysis unit 122 may extract an event and a process on the basis of machine learning. Specifically, the text data analysis unit 122 learns an event to be extracted from text data on the basis of a group of events extracted in the past from text data, and extracts the event from the text data on the basis of the learning result. In a similar way, the text data analysis unit 122 learns a process to be extracted from text data on the basis of a group of processes extracted in the past from text data, and extracts the process from the text data on the basis of the learning result.

Figure 5:
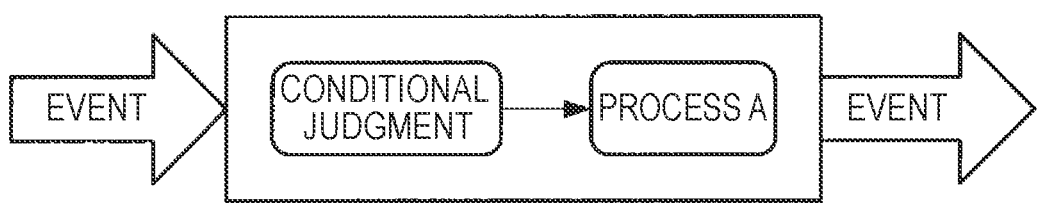
FIG. 5 is a diagram illustrating a first example of program generation.

In addition, the way of generating a program from events and processes is not specifically limited. For example, the text data analysis unit 122 generates a program from an event and a process on the basis of a prescribed rule. With reference to FIG. 5, details thereof will be described. FIG. 5 is a diagram illustrating a first example of program generation. As illustrated in FIG. 5, it is only necessary for the text data analysis unit 122 to describe whether a condition that an event has occurred is satisfied in a program as conditional judgment, and describe operation for controlling execution of the process in the program as a step to be executed in the case where the condition is satisfied.

In addition, as illustrated in FIG. 5, completion of the process itself may be treated as occurrence of an event. More specifically, the completion of the process may be recognized by the control target equipment 20 that has executed the process under the control of the execution control unit 127. In addition, when the control target equipment 20 notifies the information processing device 10 of the completion of the process, the information processing device 10 treats the issuance of the notification as occurrence of an event.

Figure 6:
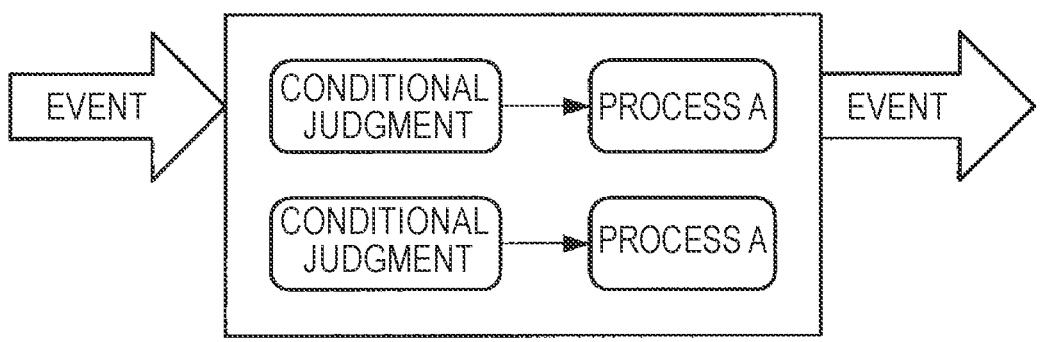
FIG. 6 is a diagram illustrating a second example of program generation.

FIG. 5 illustrates an example in which one process is executed in response to one event. However, a plurality of processes may be executed in response to one event. FIG. 6 is a diagram illustrating a second example of program generation. As illustrated in FIG. 6, it is only necessary for the text data analysis unit 122 to arrange a plurality of combinations of conditional judgment and operation for controlling execution of a process in parallel, and describe the arranged combinations in a program. When the program is generated in such a way, the program is executed, and the plurality of processes are executed in response to occurrence of the events.

Specifically, it is assumed that a third program corresponding to a third event and a third process is recorded on the storage unit 130 and a fourth program corresponding to a fourth event and a fourth process is recorded on the storage unit 130. At this time, the execution control unit 127 controls automatic execution of the third process and the fourth process when at least one of the third event and the fourth event occurs in the case where the third event and the fourth event are the identical event.

Figure 7:
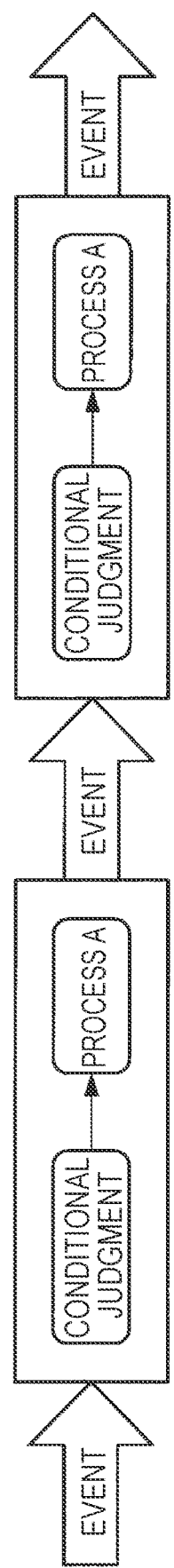
FIG. 7 is a diagram illustrating a third example of program generation.

In addition, as described above, completion of the process itself may be treated as occurrence of an event. FIG. 7 is a diagram illustrating a third example of program generation. As illustrated in FIG. 7, it is only necessary for the text data analysis unit 122 to connect a plurality of combinations of conditional judgment and operation for controlling execution of a process in series, and describe the connected combinations in a program. When the program is generated in such a way, a program is executed, and another process is executed accordingly when an event is generated in response to completion of a certain process.

Specifically, it is assumed that a first program corresponding to a first event and a first process is recorded on the storage unit 130 and a second program corresponding to a second event and a second process is recorded on the storage unit 130. In such a case, the execution control unit 127 controls execution of the first process when occurrence of the first event is detected, and the execution control unit 127 controls execution of the second process when occurrence of the second event is detected. At this time, the execution control unit 127 controls automatic execution of the second process corresponding to the first process in the case where execution of the first process corresponds to occurrence of the second event.

Figure 8:
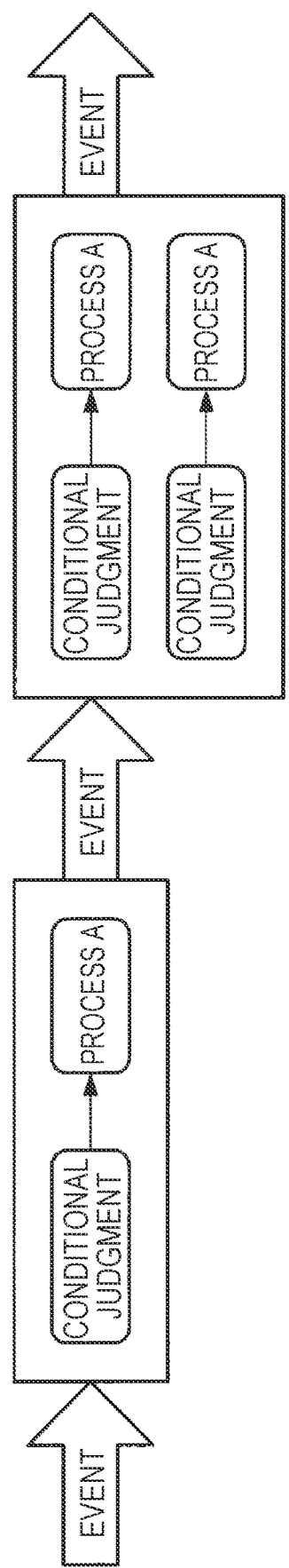
FIG. 8 is a diagram illustrating a fourth example of program generation.

In addition, it is possible to appropriately combine the example illustrated in FIG. 6 and the example illustrated in FIG. 7 as necessary. FIG. 8 is a diagram illustrating a fourth example of program generation. As illustrated in FIG. 8, the text data analysis unit 122 may connect a plurality of combinations of conditional judgment and operation for controlling execution of a process in series, describe them in a program, connect a plurality of combinations of conditional judgment and operation for controlling execution of a process in parallel, and describe them in a program. Next, details of the examples illustrated in FIG. 5 to FIG. 7 will be described.

Figure 9:
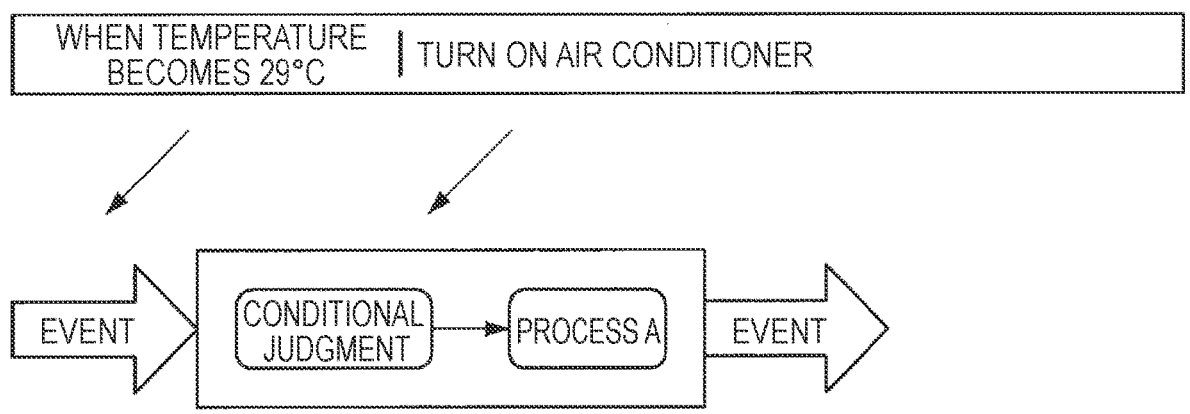
FIG. 9 is a diagram illustrating details of the first example of program generation.

FIG. 9 is a diagram illustrating details of the first example of program generation that has been described above with reference to FIG. 5. As illustrated in FIG. 9, it is assumed that text data "when temperature becomes 29° C., please turn on the air conditioner" is obtained by the text data analysis unit 122. In such a case, the text data analysis unit 122 extracts "when temperature becomes 29° C." as an event from the text data, extracts "please turn on the air conditioner" as a process from the text data, and generates a program on the basis of these extraction results. According to this program, a process of turning on the air conditioner is executed when the event in which temperature becomes 29° C. occurs.

Figure 10:
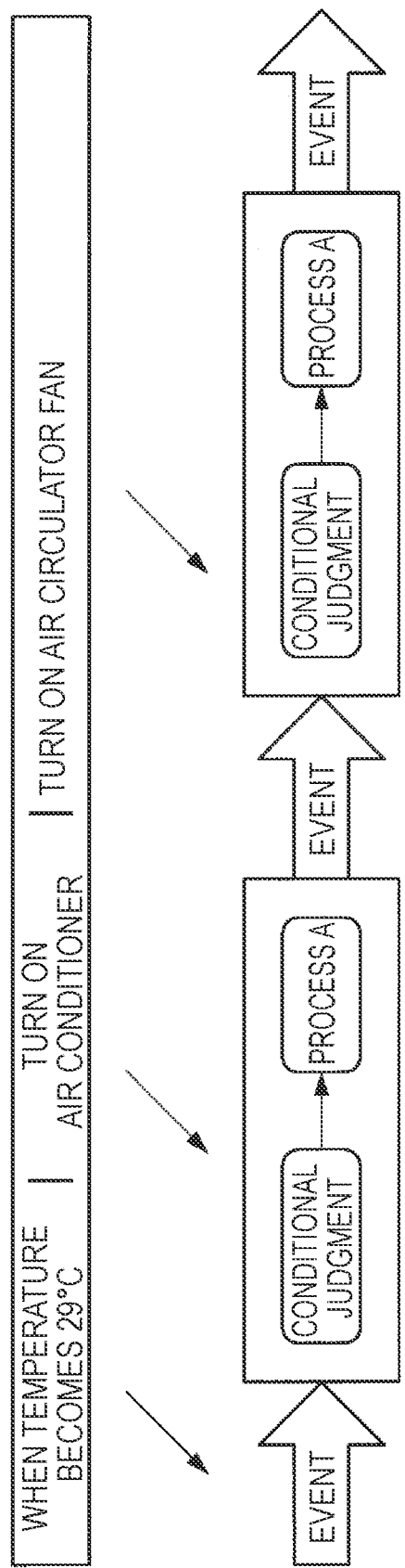
FIG. 10 is a diagram illustrating details of the second example of program generation.

FIG. 10 is a diagram illustrating details of the second example of program generation that has been described above with reference to FIG. 6. In the example illustrated in FIG. 10, the process of turning on the air conditioner is also executed when the event in which temperature becomes 29° C. occurs, in a way similar to the example illustrated in FIG. 9.

In addition, as illustrated in FIG. 10, it is assumed that text data "after turning on the air conditioner, please turn on the air circulator fan" is obtained by the text data analysis unit 122. In such a case, the text data analysis unit 122 extracts "after turning on the air conditioner" as an event from the text data, extracts "please turn on the air circulator fan" as a process from the text data, and generates a program on the basis of these extraction results. According to this program, a process of turning on the air circulator fan is executed when the event of turning on the air conditioner occurs.

Figure 11:
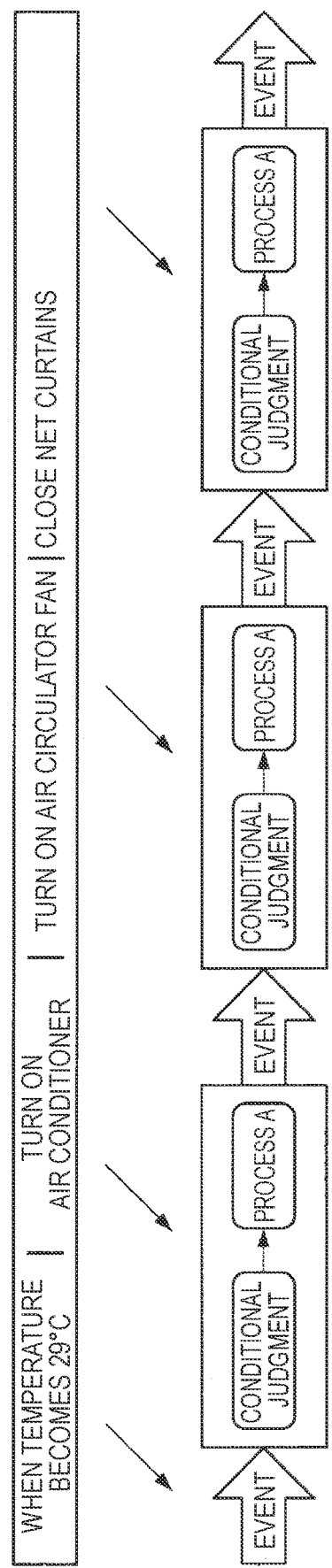
FIG. 11 is a diagram illustrating details of the third example of program generation.

Therefore, a process of turning on the air conditioner is executed when an event in which the temperature becomes 29° C. occurs. Subsequently, a process of turning of the air circulator fan is executed in conjunction with the occurrence of the event of turning on the air conditioner, FIG. 11 is a diagram illustrating details of the third example of program generation that has been described above with reference to FIG. 7. In the example illustrated in FIG. 11, it is also assumed that the process of turning on the air conditioner is executed when the event in which the temperature becomes 29° C. occurs, in a way similar to the example illustrated in FIG. 9. In addition, in the example illustrated in FIG. 11, it is also assumed that the process of turning on the air conditioner is executed when the event of turning on the air conditioner occurs, in a way similar to the example illustrated in FIG. 10.

In addition, as illustrated in FIG. 11, it is assumed that text data "after turning on the air circulator fan, please close the net curtains" is obtained by the text data analysis unit 122. In such a case, the text data analysis unit 122 extracts "after turning on the air circulator fan" as an event from the text data, extracts "please close the net curtains" as a process from the text data, and generates a program on the basis of these extraction results. According to this program, a process of closing the net curtains is executed when the event of turning on the air circulator fan occurs.

Therefore, the process of turning on the air conditioner is executed when the event in which the temperature becomes 29° C. occurs. Subsequently, the process of turning on the air circulator fan is executed in conjunction with the occurrence of the event of turning on the air conditioner, and the process of closing the net curtains is executed in conjunction with the occurrence of the event of turning on the air circulator fan.

Here, the respective types of the events and the processes are not specifically limited. FIG. 12 is a diagram illustrating an example of respective types of events and processes. For example, the events include at least any one of a speech front a user, predetermined change in an environment, detection of a predetermined signal performed by a sensor, and operation of predetermined equipment. In addition, the types of the process are not specifically limited. For example, the processes include at least any one of operation performed on predetermined equipment, operation performed on a predetermined medium, and execution of a predetermined application.

In addition, sometimes a condition of an event is necessary for generating a program. In such a case, the text data analysis unit 122 extracts the condition of the event by analyzing text data. Next, the text data analysis unit 122 records the extracted condition of the event on the storage unit 130 in association with a program indicating a correspondence relation between the event and a process. According to such a configuration, it is possible to use the condition of the event extracted from the text data, for generating a program.

Here, it is also assumed that text data does not include sufficient conditions of an event. In such a case, it is possible to request a user to present the conditions of the event. In other words, in the case where it is impossible to extract the conditions of the event from the text data, the text data analysis unit 122 preferably requests a user to present the condition of the event that is necessary for generating the program indicating the correspondence relation between the event and the process. The request may be presented to the user by outputting a voice or display.

FIG. 13 is a diagram illustrating an example of a process executed when events occur and conditions are satisfied. FIG. 13 illustrates an example in which an event in which "temperature becomes 29° C. or more", a condition that "a person is in the room", and a process of "turning on the air conditioner" are extracted from text data and a program is generated on the basis of these extraction results. In this example, the process of turning on the air conditioner is executed in the case where temperature reaches 29° C., the event in which "temperature becomes 29° C. or more" occurs, a person comes in the room, and the condition that "a person is in the room" is satisfied.

FIG. 14 is a diagram illustrating an example of a process executed when events occur and conditions are satisfied. FIG. 14 illustrates an example in which an event in which "the weather forecast says it will be raining", a condition that "the user is out", and a process of "proposing to bring an umbrella" are extracted from text data and a program is generated on the basis of these extraction results. In this example, the process of proposing the user to bring an umbrella is executed in the case where the event in which "the weather forecast says it will be raining" occurs, a person gets out of the room, and the condition that "the user is out" is satisfied. The proposal may be presented to the user by outputting a voice or display.

The example in which the text data analysis unit 122 extracts the event included in the text data and the process to be executed in accordance with the event and the record control unit 123 records the correspondence relation between the event and the process on the storage unit 130 as the program, has been described above. However, in the case where it is possible to analyze behavior of the user, the record control unit 123 may recognize the correspondence relation between the event and the process on the basis of a result of the analysis of the behavior of the user, and may record the recognized correspondence relation on the storage unit 130 as a program. This enables to further reduce the user's burden to register the program.

For example, the record control unit 123 records a correspondence relation between a fifth event and a fifth process on the storage unit 130 as a fifth program in the case where it is detected that the fifth process is performed within a predetermined period of time after occurrence of the fifth event. In this case, it is preferable for the record control unit 123 to check with the user whether to perform the fifth process in response to the occurrence of the fifth event on the basis of the fifth program recorded on the storage unit 130. The checking with the user may be made in any way. For example, the user may be asked a question through voice output or display, and an answer is acquired from the user through voice input or image capturing.

FIG. 15 is a diagram illustrating an example in which a correspondence relation between events and processes is recognized on the basis of a user behavior analysis result. FIG. 15 illustrates a case where a light is turned on within a predetermined period of time after a user closes curtains. In this case, it is preferable for the record control unit 123 to record a correspondence relation between the event of closing curtains and the process of turning on the light on the storage unit 130 as a program. Accordingly, the light automatically turns on when the event of closing curtains occurs.

In addition to or instead of whether the process is performed within the predetermined period of time, frequency of behavior of the user may be considered. In other words, in the case where it is detected that the sixth process is performed at predetermined or higher frequency after occurrence of the sixth event, the record control unit 123 may record a correspondence relation between the sixth event and the sixth process on the storage unit 130 as a sixth program. It is also possible to reduce the user's burden to register the program in such a case.

In this case, it is preferable for the record control unit 123 to check with the user whether to perform the sixth process in response to the occurrence of the sixth event on the basis of the recorded sixth program. The checking with the user may be made in any way. For example, the user may be asked a question through voice output or display, and an answer is acquired from the user through voice input or image capturing.

Note that, the user may be asked a question about whether to perform the process in response to occurrence of an event in every case of recording a program on the storage unit 130. Here, with regard to check with the user, the question may be asked to the user through voice output or display in any way. For example, the record control unit 123 may cause a text "may I turn on the light after the curtains are closed?" to be displayed or output in voice in the case where the storage unit 130 records the correspondence relation between the event of closing the curtains and the process of turning on the light as a program.

In addition, "curtain close" is a paraphrase of "close curtain", and "switch on the light" and "light on" are paraphrases of "turn on light". Therefore, in the case where past speech content of the user is recorded, the record control unit 123 may select an expression that has been most frequently spoken by the user. Alternatively, the record control unit 123 may select an expression that has been spoken by the user, in the case where past speech content of the user is recorded.

In the case where the record control unit 123 records the correspondence relation between the event and the process as a program on the storage unit 130, occurrence of the event may be detected from completion of a process whose execution is controlled by the execution control unit 127. For example, when execution of the process of closing curtains on the basis of speech "please close the curtains" from a user is controlled by the execution control unit 127 and an event of closing the curtains occurs, the execution control unit 127 may control execution of a process of turning on the light in response to occurrence of the event.

Alternatively, the occurrence of the event may be detected from completion of a process directly executed through hand motion of the user. For example, when curtains are closed directly through hand motion of the user and an event of closing the curtains occurs, the execution control unit 127 may control execution of a process of turning on the light in response to occurrence of the event. As described above, various kinds of patterns are assumed as event occurrence patterns. Therefore, it can be said that there is a high degree of freedom for occurrence of events.

It is assumed that programs recorded on the storage unit 130 overlap each other when programs are continuously recorded on the storage unit 130. In such a case, the user may be notified that the same program as the program that is about to be recorded on the storage unit 130 has already been recorded on the storage unit 130. Here, any way can be used for transmitting the notification to the user. For example, the notification may be transmitted to the user by outputting a voice or display.

More specifically, it is assumed that an instruction to record a correspondence relation between an event and a process on the storage unit 130 as a program is acquired from the text data analysis unit 122. At this time, the record control unit 123 notifies a user that the program instructed to be recorded has already been recorded, in the case where a program (such as the same program) substantially corresponding to the program instructed to be recorded on the storage unit 130 has already been recorded on the storage unit 130.

In addition, it is also assumed that events recorded on the storage unit 130 overlap each other without the user's intention when programs are continuously recorded on the storage unit 130. It such a case, the user may be notified that the same event as the event that is about to be recorded on the storage unit 130 has already been recorded on the storage unit 130. Here, any way can be used for transmitting the notification to the user. For example, the notification may be transmitted to the user by outputting a voice or display.

More specifically, it is assumed that an instruction to record a correspondence relation between an event and a process on the storage unit 130 as a program is acquired from the text data analysis unit 122. At this time, it is preferable for the record control unit 123 to notify a user that the program instructed to be recorded has already been recorded, in the case where an event (such as the same event) substantially corresponding to an event of the program instructed to be recorded on the storage unit 130 has already been recorded on the storage unit 130. Here, any way can be used for transmitting the notification to the user. For example, the notification may be transmitted to the user by outputting a voice or display. In addition, an answer may be acquired from the user through voice input or image capturing.

Figure 16:
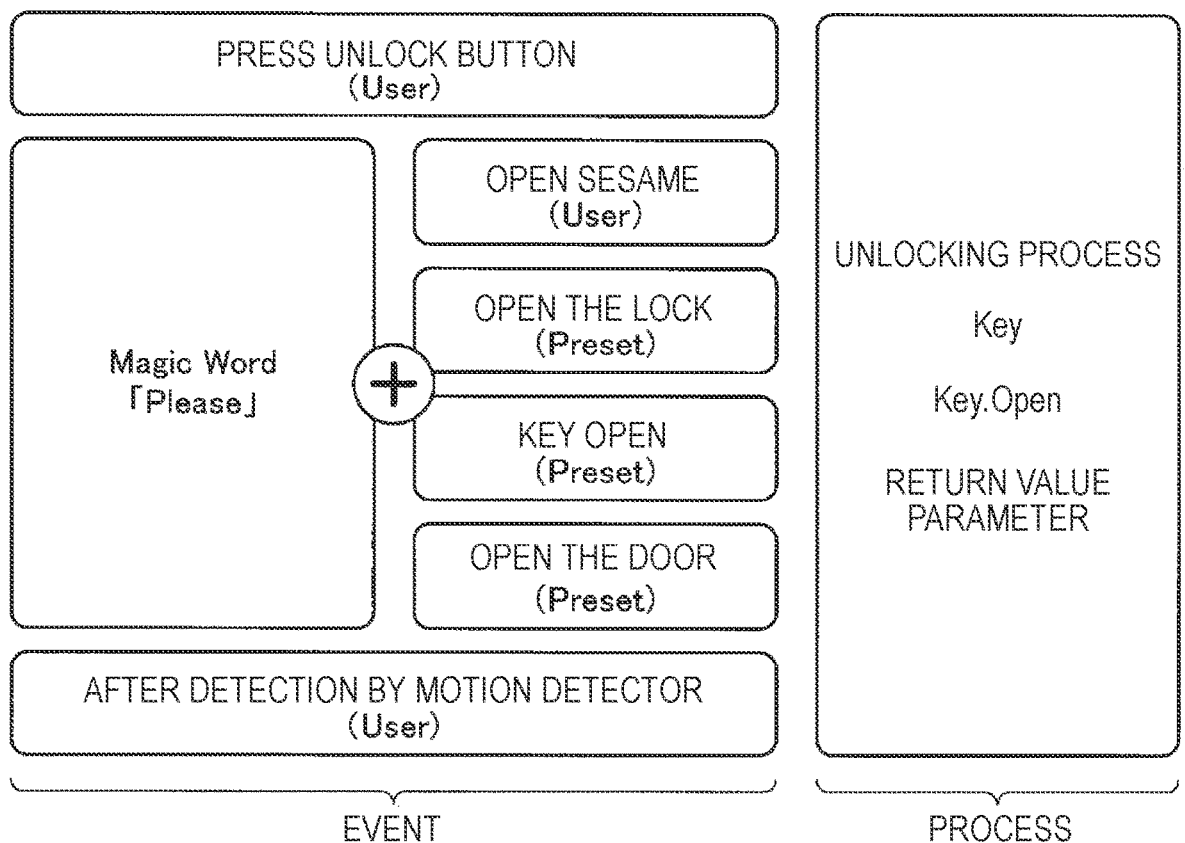
FIG. 16 is a diagram illustrating an example of correspondence relations between events and processes.

In addition, an association between one event and a plurality of processes is acceptable. Therefore, in the case where the user replies that overlap between events is acceptable, it is only necessary for the record control unit 123 to record a program instructed to be recorded on the storage unit 130, as it is. On the other hand, an association between one process and a plurality of event is also acceptable. FIG. 16 is a diagram illustrating an example of correspondence relations between events and processes. As illustrated in FIG. 16, the process "unlocking process" may be associated with a plurality of events ("pressing of an unlock button", "magic word+speaking of predetermined wording (open sesame, please open the lock, key open, open the door, or the like)", and "after detection by a motion detector"). Here, the magic word means a keyword that is set in advance such that the agent understands that a user is talking to the agent. For example, when the user talks to the agent by using the magic word, the agent enters a standby state for reception of an instruction from the user.

The timing of adding a process to the storage unit 130 is not specifically limited. For example, in the case where new control target equipment 20 is registered, the record control unit 123 may generate an instance and add a process in the instance to the storage unit 130. Alternatively, the record control unit 123 may add a process in a new application to the storage unit 130 in the case where the new application is installed. In addition, in the case where a process in an application is added, the record control unit 123 may add the added process to the storage unit 130. Note that, it is understood that the instance, the object, and the class which are described in the present specification substantially correspond to an instance, an object, and a class which are defined in general object-oriented programming. Specifically, it may be considered that the object described in the present specification corresponds to the control target equipment.

Here, it is assumed that an instruction to record a correspondence relation between an event and a process on the storage unit 130 as a program is acquired from the text data analysis unit 122. In this case, it is assumed that equipment for performing the process is not detected. For example, there is a possibility that the equipment is not detected through communication. Therefore, in this case, it is preferable for the record control unit 123 to notify a user that it is impossible to execute at least a part of a process included in the instruction (it is impossible to execute the process included in the instruction). The notification may be transmitted to the user by outputting a voice or display.

In the case where the equipment for performing the process is not detected as described above, it is preferable for the record control unit 123 to propose acquisition of equipment for performing the process. Specifically, the record control unit 123 asks a server (not illustrated) about the equipment for performing the process. In the case where information regarding the equipment is included in the server (not illustrated), the record control unit 123 proposes the information regarding the equipment. The proposal may be transmitted to the user by outputting a voice or display.

In a similar way, it is assumed that an application for performing a process is not detected in the case where an instruction to record a correspondence relation between an event and a process on the storage unit 130 as a program is acquired from the text data analysis unit 122. For example, there is a possibility that the application is not recorded on the storage unit 130. Therefore, in this case, it is preferable for the record control unit 123 to notify a user that it is impossible to execute at least a part of a process included in the instruction (it is impossible to execute the process included in the instruction). The notification may be transmitted to the user by outputting a voice or display.

In the case where the application for performing the process is not detected as described above, it is preferable for the record control unit 123 to propose acquisition of the application for performing the process. Specifically, the record control unit 123 asks a server (not illustrated) about the application for performing the process. In the case where information regarding the application is included in the server (not illustrated), it is preferable for the record control unit 123 to propose the information regarding the application. The proposal may be transmitted to the user by outputting a voice or display.

Figure 17:
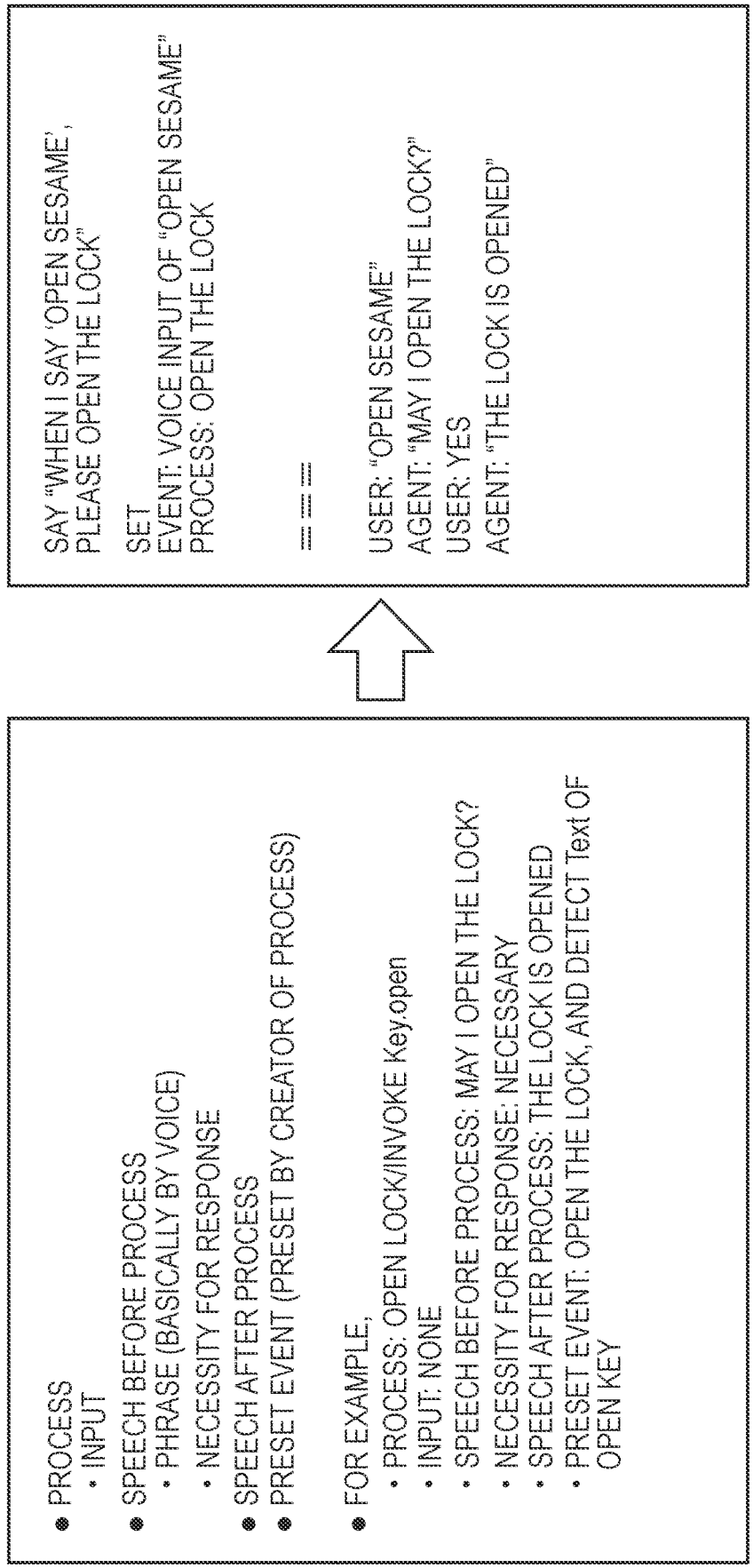
FIG. 17 is a diagram illustrating an image of program registration and process execution based on the registered program.

Next, an image of program registration and process execution based on the registered program will be described. FIG. 17 is a diagram illustrating the image of program registration and process execution based on the registered program. As illustrated in FIG. 17, first, a user speaks a request for the agent (information processing device 10) when I say 'open sesame', please open the lock". The sound collection unit 113 collects the speech from the user, and the text data generation unit 121 generates text data "when I say open sesame please open the lock". Next, the text data analysis unit 122 extracts and sets an event of "voice input of 'open sesame'" and a process of "opening the lock".

In the case where the user speaks "open sesame" in such a state in which the event and the process are set, "input (input of a security code or the like) is not necessary. Accordingly, the agent outputs wording are you sure you want me to open the lock?" by voice on the basis of "speech before process". Since "necessity for response" indicates "necessary", the agent outputs wording "the lock is opened" by voice on the basis of "speech after process" when the user answers "yes". Next, the agent opens the lock and detects text of the open key in accordance with a "preset event".

In addition, the number of objects corresponding to the object included in the event (or the process) extracted from the text data is not limited to one. In other words, it is also assumed that a plurality of objects corresponding to the object included in the event (or the process) extracted from the text data are detected. In such a case, it is preferable for the record control unit 123 to decide objects included in at least one of the event and the process on the basis of at least one of a place where the text data is acquired (position of the user) and an attribute of a user (age of the user, sex of the user, or the like).

Figure 18:
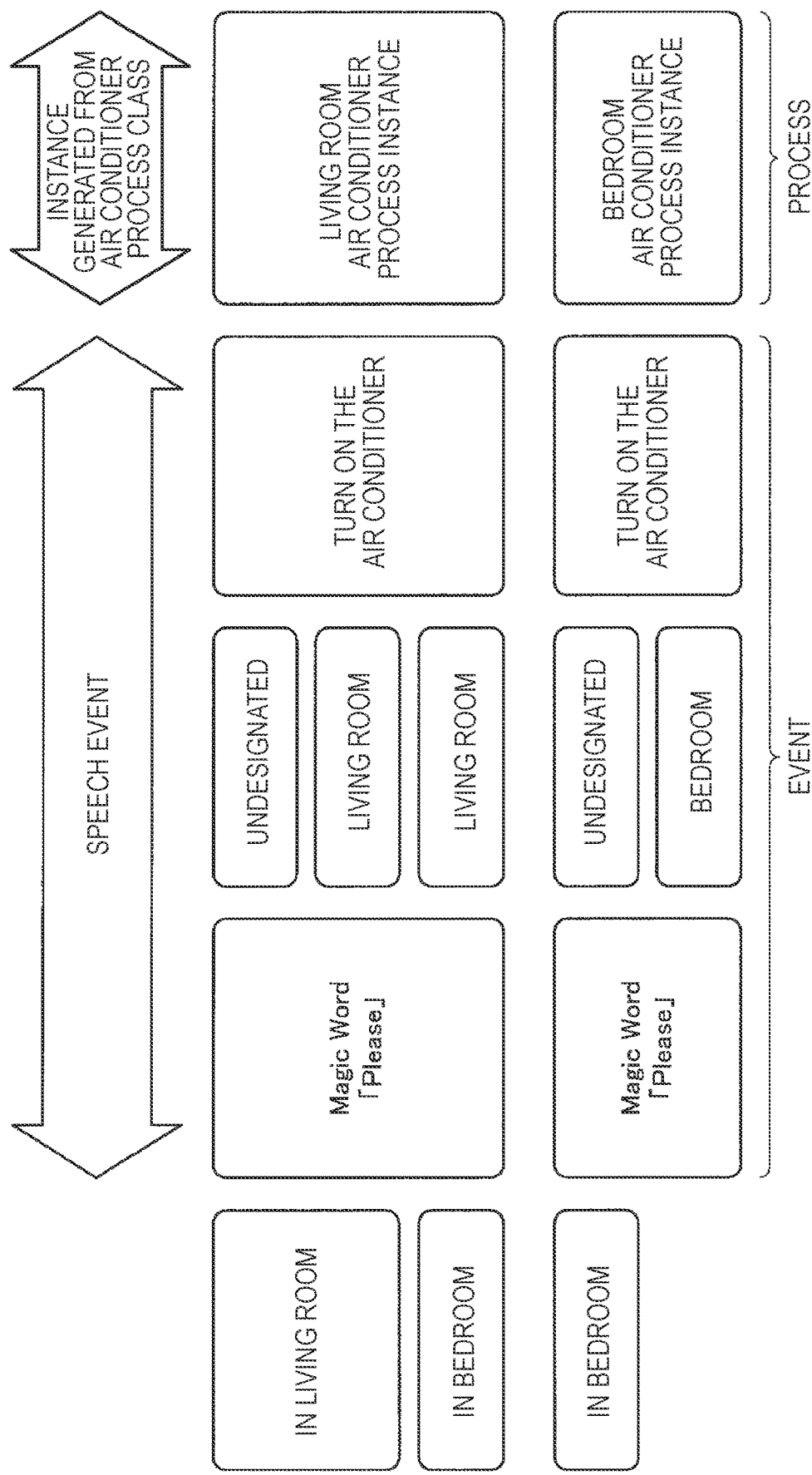
FIG. 18 is a diagram illustrating an example of deciding an object included in an event.

FIG. 18 is a diagram illustrating an example of deciding an object included in an event. As illustrated in FIG. 18, a "living room air conditioner process instance" and a "bedroom air conditioner process instance" are assumed as instances generated from an air conditioner process class. First, it is assumed that the user is in the living room, the user speaks a "magic word", and the user speaks "please turn on the air conditioner" without designating its place. In this case, the record control unit 123 decides that the target is an air conditioner in the living room that matches the position of the user, from among the air conditioner installed in the living room and the air conditioner installed in the bedroom.

On the other hand, it is assumed that the user is in the living room, the user speaks a "magic word", and the user speaks "please turn on the air conditioner in the living room". In this case, the record control unit 123 decides that the target is the air conditioner in the living room on the basis of the speech from the user. Alternatively, it is assumed that the user is in the bedroom, the user speaks a "magic word", and the user speaks "please turn on the air conditioner in the living room". In this case, the record control unit 123 decides that the target is the air conditioner in the living room on the basis of the speech from the user.

Next, it is assumed that the user is in the bedroom, the user speaks a "magic word", and the user speaks "please turn on the air conditioner" without designating its place. In this case, the record control unit 123 decides that the target is the air conditioner in the bedroom that matches the position of the user, from among the air conditioner installed in the living room and the air conditioner installed in the bedroom. Alternatively, it is assumed that the user is in the bedroom, the user speaks a "magic word", and the user speaks "please turn on the air conditioner in the bedroom". In this case, the record control unit 123 decides that the target is the air conditioner in the bedroom on the basis of the speech from the user.

Here, it is possible to present the user with a program recorded on the storage unit 130. This allows the user to recognize what kind of the program is recorded on the storage unit 130. In this case, the presentation control unit 124 may simplify the program recorded on the storage unit 130 by using at least one of text and a diagram and present the simplified program to a user. As one of the examples, an example of simplifying a program recorded on the storage unit 130 and presenting the simplified program to a user in a text form will be described.

Figure 19:
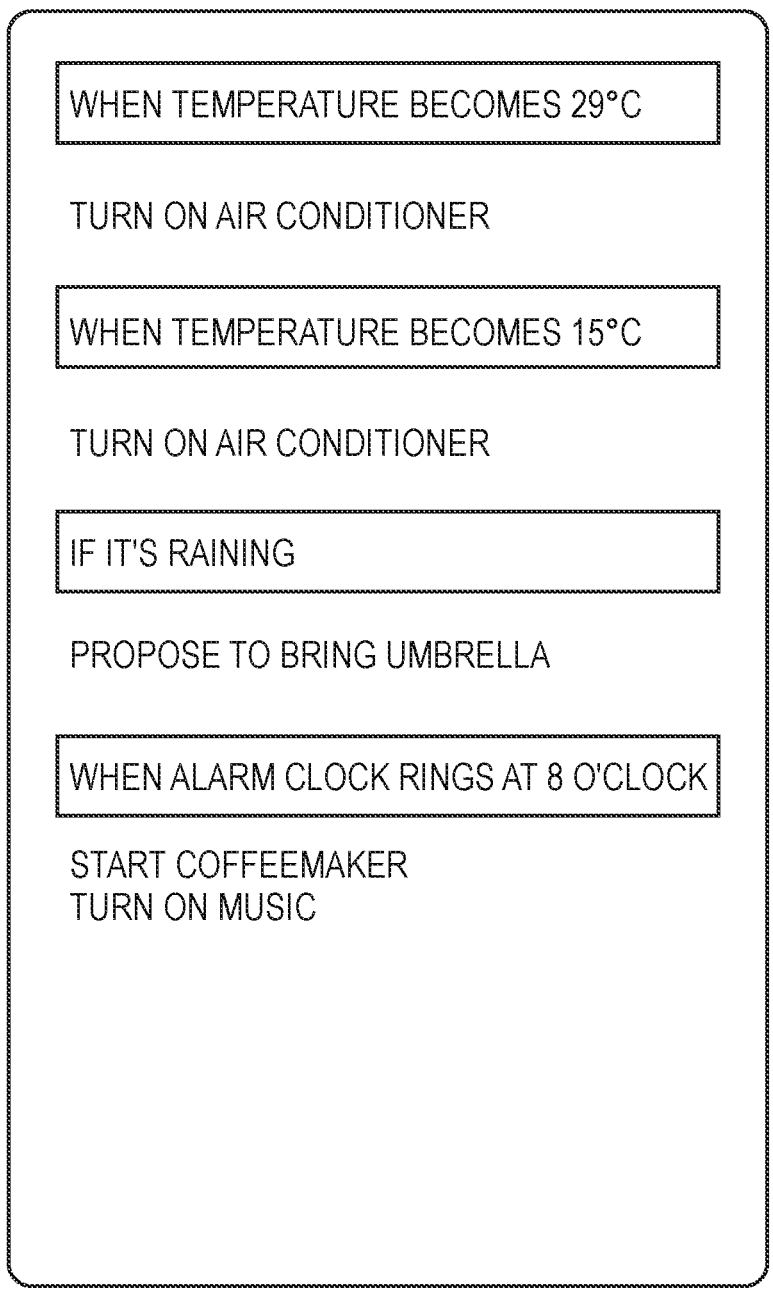
FIG. 19 is a diagram illustrating an example of simplifying programs recorded on a recording unit and presenting the simplified programs to a user in a text form.

FIG. 19 is a diagram illustrating the example of simplifying programs recorded on the storage unit 130 and presenting the simplified programs to a user in a text form. As illustrated in FIG. 19, it is possible for the presentation control unit 124 to allow the user to recognize that a correspondence relation between an event and a process is recorded on the storage unit 130 as a program, by presenting the event "when temperature becomes 29° C." and the process of "turning on the air conditioner".

In addition, FIG. 19 illustrates an example in which the presentation control unit 124 presents the event "when temperature becomes 15° C." and the process of "turning on the air conditioner", presents the event "if it's raining" and the process of "proposing to bring an umbrella", and presents the event "when the alarm clock rings at 8 o'clock", the process of "starting the coffeemaker", and the process of "turning on music". Note that, the correspondence relations between events and processes may be presented in event units as illustrated in FIG. 19, may be presented in class units, or may be presented in equipment units.

Here, in the case where the process is executed in response to occurrence of an event, sometimes it is desirable to get a state back to a state before execution of the process when the event ends. For example, it is assumed to execute a process of reducing sound volume of equipment that is outputting sound (muting the equipment that is outputting sound) in the case where a phone-call reception event occurs. In this case, the record control unit 123 preferably controls recording on the storage unit 130 such that sound volume of the equipment is brought back to sound volume before the reduction when a phone-call end event occurs.

In other words, to record a correspondence relation between an event and a process on the storage unit 130 as a program, it is preferable for the record control unit 123 to automatically record a program for recovering the process (hereinafter, also referred to as "recovery program") on the storage unit 130 when an event included in text data ends.

Note that, it is also possible for the record control unit 123 to cause the storage unit 130 to store a record of "turning off the air conditioner when temperature becomes less than a predetermined value (29° C.)" in the case where the storage unit 130 includes a record of "turning on the air conditioner when temperature becomes a predetermined value (29° C.) or more". Alternatively, the record control unit 123 may cause the storage unit 130 to store a record of "turning off the air circulator fan when the air conditioner is turned off" in the case where the storage unit 130 includes a record of "turning on the air circulator fan when the air conditioner is turned on".

The recovery program may be recorded on the storage unit 130 without permission of the user when reduction of the user's burden is focused on. However, when intention of the user is more focused on than the reduction of the user's burden, it is preferable to record the recovery program after acquiring the permission of the user. In other words, the record control unit 123 may automatically record the recovery program on the storage unit 130 only in a case where permission to record the recovery program on the storage unit 130 is acquired from the user. For example, a question may be transmitted to the user by outputting a voice or display. In addition, an answer is acquired from the user through voice input or image capturing.

Here, the recovery program may always be recorded automatically, or may be recorded automatically only in the case where a condition is satisfied. For example, in the case where the process has already been executed before occurrence of an event and the process is continuously being executed after occurrence of the event, a direct cause of execution of the process is not limited to occurrence of the event. Therefore, it is not always desirable to get a state back to a state before execution of the process every time the event ends. Therefore, when the event ends, the execution control unit 127 may stop the execution of the process or may continuously execute the process in the case where the process has been executed before occurrence of the event.

Figure 20:
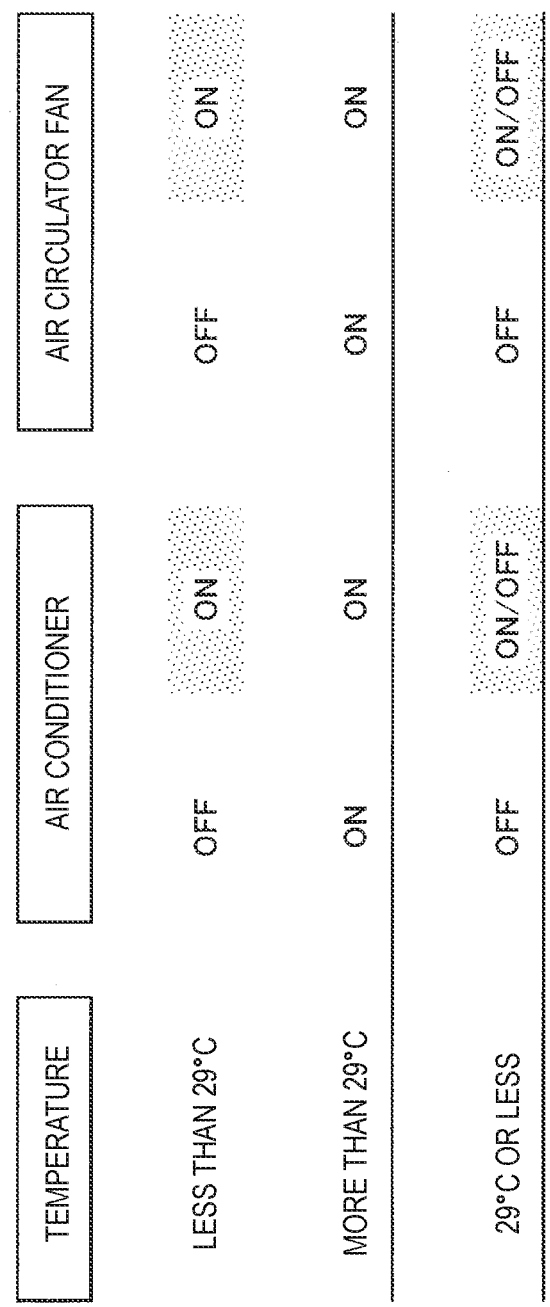
FIG. 20 is a diagram illustrating an example of conditional automatic recording of a recovery program.

FIG. 20 is a diagram illustrating an example of conditional automatic recording of a recovery program. As illustrated in FIG. 20, it is assumed that a correspondence relation between an event "when temperature exceeds 29° C." and a process of "turning of the air conditioner" is recorded on the storage unit 130 as a program. At this time, in the case where the air conditioner is in the OFF state before the temperature exceeds 29° C., the execution control unit 127 may turn on the air conditioner when the temperature exceeds 29° C., and the execution control unit 127 may turn off the air conditioner when the temperature becomes 29° C. or less.

On the other hand, in the case where the air conditioner is in the ON state before the temperature exceeds 29° C., the execution control unit 127 leaves the air conditioner in the ON state continuously even when the temperature exceeds 29° C. In addition, if the temperature becomes 29° C. or less, the direct cause of turning on the air conditioner is not limited to the temperature rise to more than 29° C. Therefore, it is not always desirable to get the air conditioner back to the OFF state. Accordingly, when the temperature becomes 29° C. or less, the execution control unit 127 may turn on the air conditioner or may turn off the air conditioner.

In addition, as illustrated in FIG. 20 it is assumed that a correspondence relation between an event "when temperature exceeds 29° C." and a process of "turning on the air circulator fan" is recorded on the storage unit 130 as a program. At this time, in the case where the air circulator fan is in the OFF state before the temperature exceeds 29° C. the execution control unit 127 turns on the air circulator fan when the temperature exceeds 29° C., and the execution control unit 127 turns off the air circulator fan when the temperature becomes 29° C. or less.

On the other hand, in the case where the air circulator fan is in the ON state before the temperature exceeds 29° C., the execution control unit 127 leaves the air circulator fan in the ON state continuously even when the temperature exceeds 29° C. In addition, if the temperature becomes 29° C. or less, the direct cause of turning on the air circulator fan is not limited to the temperature rise to more than 29° C. Therefore, it is not always desirable to get the air circulator fan back to the OFF state. Accordingly, when the temperature becomes 29° C. or less, the execution control unit 127 may turn on the air circulator fan or may turn off the air circulator fan.

It is possible for the agent (information processing device 10) to generate, register, edit, or delete an event between the user and the control target equipment 20. However, a notification of occurrence of an event may be directly issued between pieces of equipment. For example, in the case where an event is detected, occurrence of the event may be broadcasted to all pieces of equipment.

Figure 21:
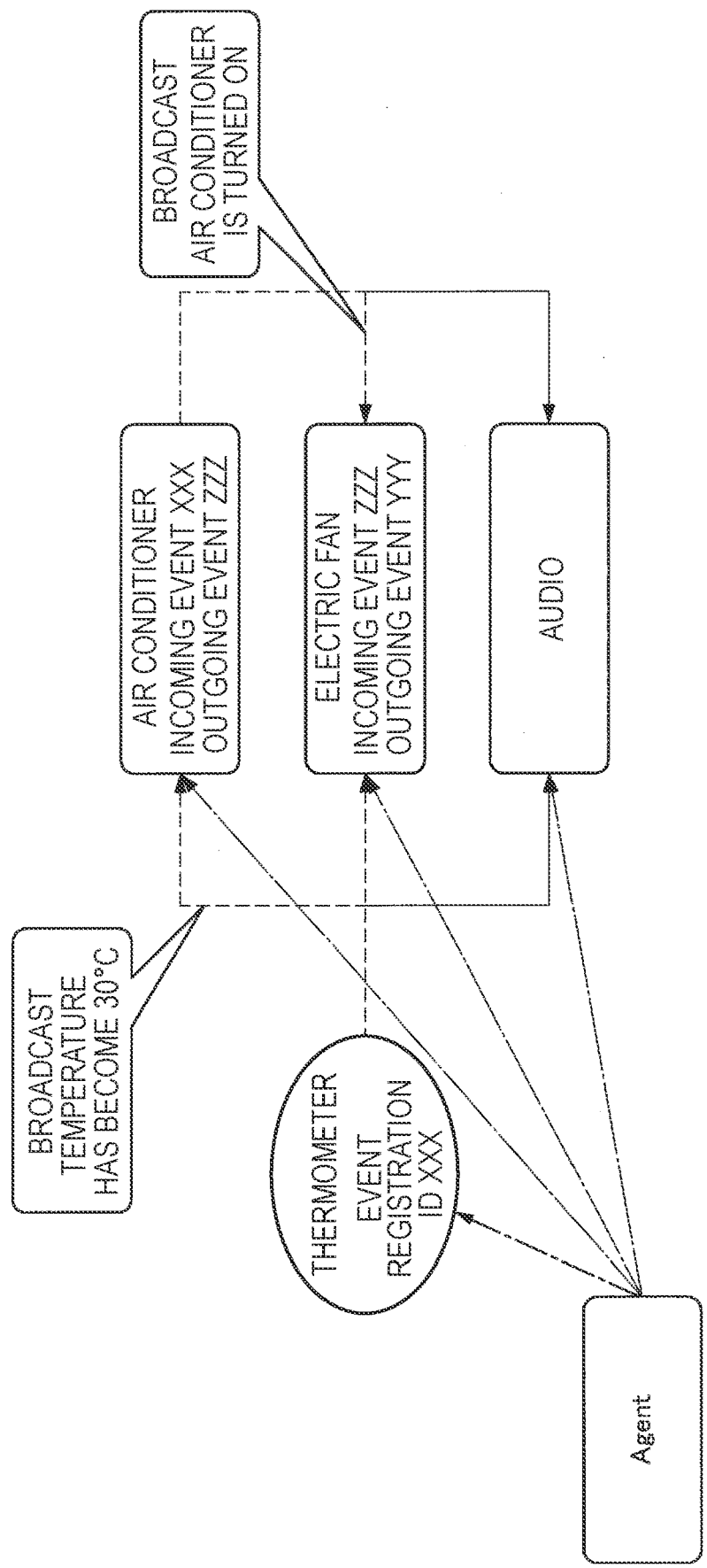
FIG. 21 is a diagram illustrating an example of broadcasting occurrence of an event to all pieces of equipment.

FIG. 21 is a diagram illustrating an example of broadcasting occurrence of an event to all pieces of equipment. As illustrated in FIG. 21, the agent registers an event (ID: XXX) "when temperature becomes 30° C." in a thermometer. In addition, the agent registers the event (ID: XXX) in the air conditioner as an incoming event, and registers a process of "turning on the air conditioner" in the air conditioner as a process corresponding to the event (ID: XXX). In addition, the agent registers an event (ID: ZZZ) "when the air conditioner is turned on" as an outgoing event.

In addition, the agent registers the event (ID: ZZZ) in the electric fan as an incoming event, and registers a process of "turning on the electric fan" in the air conditioner as a process corresponding to the event (ID: ZZZ). In this case, when detecting occurrence of the event (ID: XXX) "when temperature becomes 30° C.", the thermometer broadcasts the event to the air conditioner, the electric fan, and an audio. The process of "turning on the air conditioner" corresponding to the event is executed by the air conditioner in which the event (ID: XXX) is registered as the incoming event.

Next, when occurrence of the event (ID: ZZZ) "when the air conditioner is turned on" is detected, the air conditioner broadcasts the event to the electric fan and the audio. The process of "turning on the electric fan" corresponding to the event is executed by the electric fan in which the event (ID: ZZZ) is registered as the incoming event. Note that, FIG. 21 illustrates the example in which the pieces of equipment receive and transmit the events. However, it is also possible for the agent to receive and transmit events.

Figure 22:
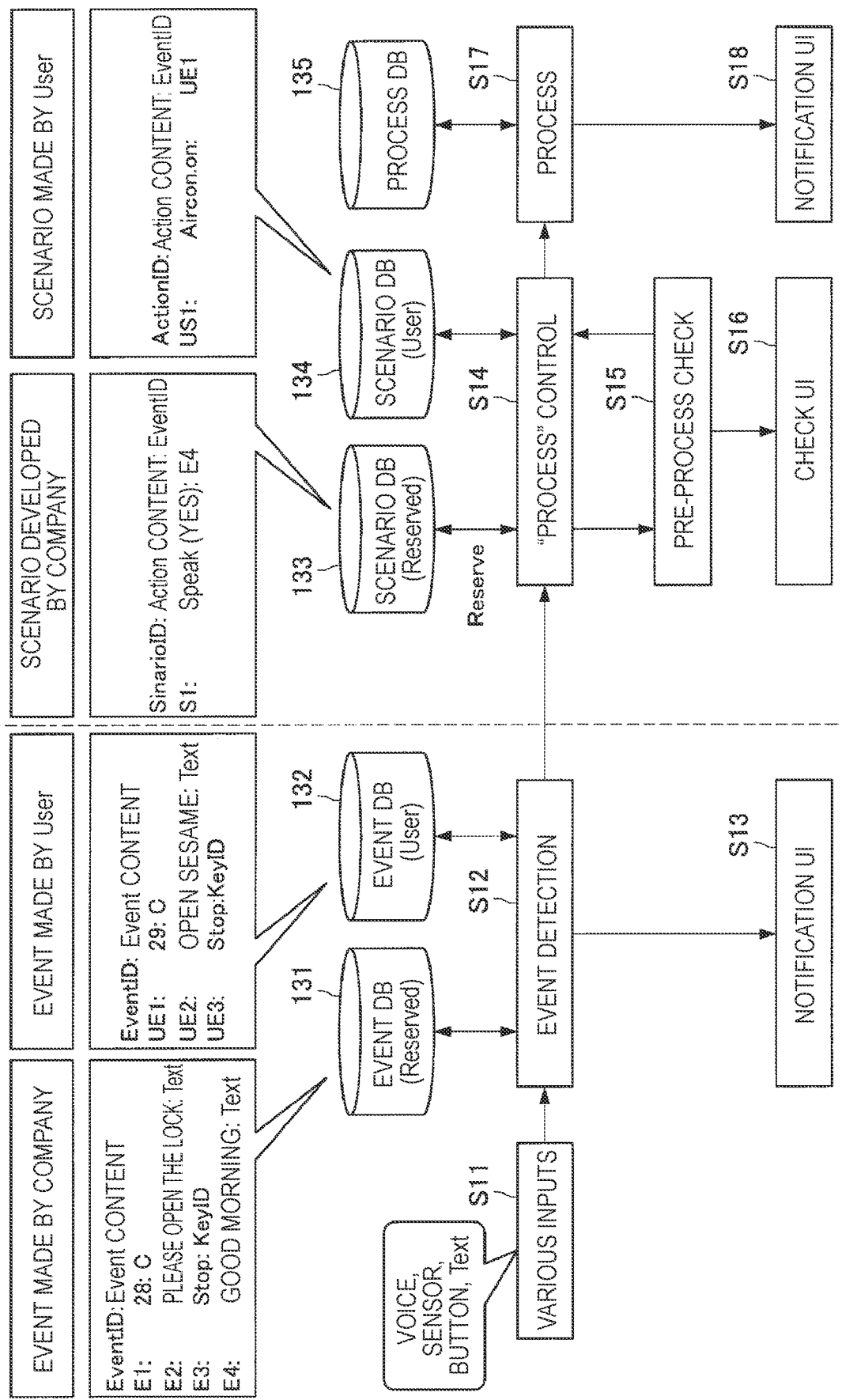
FIG. 22 is a diagram illustrating a first example of operation at the time when an event occurs.

Next, an example of operation at a time when an event occurs will be described. FIG. 22 is a diagram illustrating a first example of the operation at the time when an event occurs. As illustrated in FIG. 22, various kinds of input (such as voice input, detection performed by a sensor, pressing on a button, a text input) are performed (S11). In this case, data in which an event ID and event content are associated with each other is recorded on an event DB (reserved) 131 (event generated by company). On the other hand, data in which an event ID and event content are associated with each other is also recorded on an event DB (user) 132 (event generated by user).

When occurrence of an event is detected (S12), the control target equipment 20 notifies of the occurrence of the event, and acquires an event ID corresponding to the event content from the event DB (reserved) 131 or the event DB (user) 132. In this case, data in which a sinario ID and action content are associated with each other is recorded on a scenario DB (reserved) 133 (scenario developed by company). On the other hand, data in which an action ID, action content, and an event ID are associated with each other is recorded on an scenario DB (user) 134 (scenario developed by user).

Next, the control target equipment 20 acquires action content corresponding to the acquired event ID from the scenario DB (reserved) 133 or the scenario DB (user) 134. The control target equipment 20 checks with the user (S15) by using a check UI (S16) to confirm whether to execute a process corresponding to the acquired action content. Subsequently, the control target equipment 20 executes the process (S14) when an instruction to execute the process is received from the user.

Specifically, data in which the action content and the process are associated with each other is recorded on the process DB 135. The control target equipment 20 acquires the process corresponding to the acquired action content from the process DB 135, and executes the process on the basis of the acquired process (S17). In addition, it is also possible for the control target equipment 20 to notify the user of execution of the process by using a predetermined notification UI (S18).

Although FIG. 22 illustrates the example in which the control target equipment 20 executes a process, it is also possible for the information processing device 10 (agent) to have the function of controlling execution of a process. FIG. 23 is a diagram illustrating a second example of the operation at the time when an event occurs. As illustrated in FIG. 23, the event occurrence detection unit 126 of the agent may perform event detection (S12), and the execution control unit 127 of the agent may perform process control (S14), pre-process check (S15) and a process (S17). In this case, the process whose execution is controlled by the agent may be performed by the control target equipment 20 (such as any pieces 20-1 to 20-3 of control target equipment).

Next, an example of operation at a time of program registration will be described. FIG. 24 is a diagram illustrating a first example of the operation at the time of program registration. As illustrated in FIG. 24, voice (such as "when I say 'open sesame', please open the lock") is input (S21). Next, the text data generation unit 121 performs magic word recognition and speech recognition processes on the input voice, and generates text data. In this case, characters (such as "when I say 'open pon', please open sesame") may be input instead of the input voice.

In this case, data in which an event ID and a speaking style are associated with each other is recorded on an event template DB (reserved) 136 (event template made by company). The text data analysis unit 122 acquires, from the event template DB (reserve) 136, a speaking style corresponding to the text data generated by the text data generation unit 121, and acquires event content corresponding to the event ID of the speaking style from the event DB (reserve) 131.

In the case where the event content is not acquired from the event DB (reserve) 131, the text data analysis unit 122 acquires, from the event DB (user) 132, an event ID corresponding to an event extracted from the text data generated by the text data generation unit 121 (S26). In addition, from the scenario DB (reserved) 133 or a scenario DB (user) 134, the text data analysis unit 122 extracts action content corresponding to a process extracted from the text data generated by the text data generation unit 121 (S27).

Next, the record control unit 123 generates a scenario (program) by associating the acquired event ID with the action content (S28), and checks with the user regarding the scenario (S29). Next, in the case where the user inputs an instruction to register the scenario, the record control unit 123 records the scenario on the scenario DB (user) 134.

Here, the data registered in advance in the event DB is not specifically limited. However, systemizable events are preferably recorded in advance in the event DB as knowledge. For example, data systemized by people (such as natural phenomena including time, temperature, humidity, and the like) are preferably registered in advance in the event DB as knowledge. Such data systemized by people may be managed in a common platform.

In addition, the example of extracting an event with reference to the event DB and extracting a process with reference to the scenario DB has been described above. However, it is also considered that the event and the process are extracted by analyzing a structure of text data. In this case, it is only necessary to register wording "music" and "play" in advance in the event DB for extracting an event "when playing music", for example. In addition, it is only necessary to register wording "lock" and "open" in advance in the scenario DB for extracting a process of "opening the lock".

Figure 25:
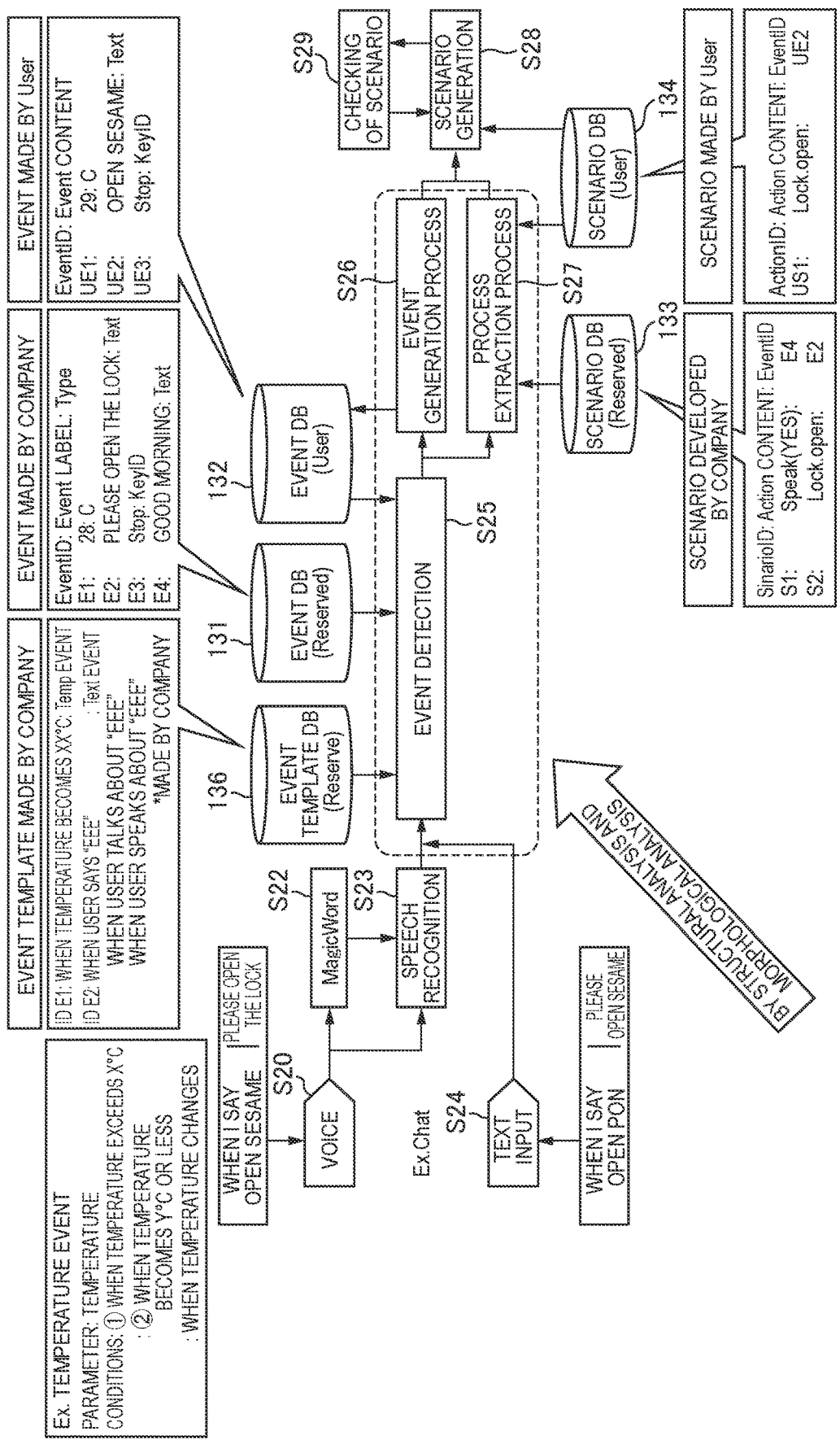
FIG. 25 is a diagram illustrating a second example of operation at the time of program registration.

FIG. 25 is a diagram illustrating a second example of the operation at the time of program registration. FIG. 24 has illustrated the example in which the event content (S25) and the event II) (S26) are acquired from the event DB, and the action content (S27) is extracted from the scenario DB. However, as illustrated in FIG. 25, the acquisition of the event content (S25), the acquisition of the event ID (S26), and the extraction of the action content (S27) may be executed through structural analysis and morphological analysis.

Figure 26:
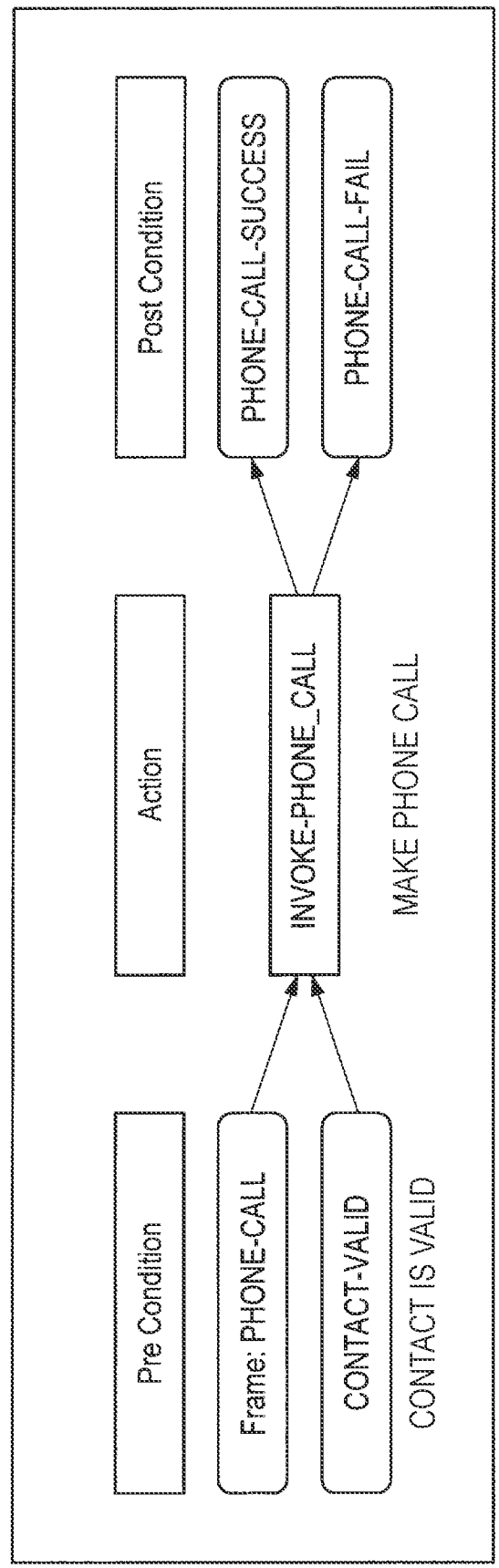
FIG. 26 is a diagram illustrating an implementation example of Action.

Next, a specific example of program generation will be described. The "Action" is implemented on the assumption that all pieces of information "Pre Condition" necessary for execution are obtained. FIG. 26 is a diagram illustrating an implementation example of Action. In the example illustrated in FIG. 26, the "Pre Condition" of a phone call making action "INVOKE-PHONE_CALL" includes a phone call action "Frame: PHONE-CALL" and a condition "CONTACT-VALID" that a contact partner is specified. When the "Pre Condition" is satisfied, it is possible to make a phone call.

Figure 27:
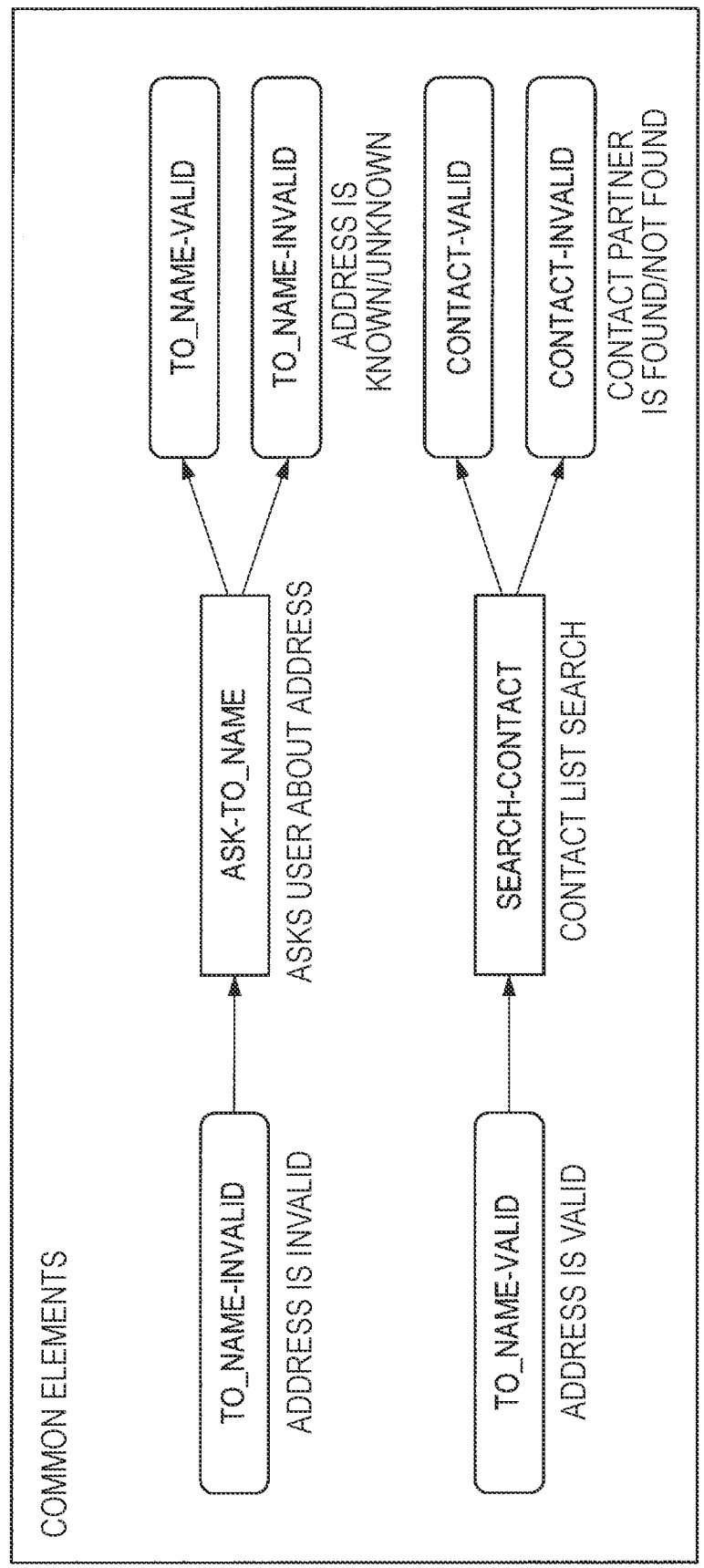
FIG. 27 is a diagram illustrating an example of common elements.

Here, the implementation will be completed when an action for outputting the necessary "Pre Condition" as an event exists as an element. In other words, it is only necessary to prepare, as the element, Action for outputting "CONTACT-VALID" as the event. FIG. 27 is a diagram illustrating an example of common elements. As illustrated in FIG. 27, contact list search "SEARCH-CONTACT" is necessary for obtaining "CONTACT-VALID" (valid contact partner). In addition, a valid address "TO-NAME-VALID" is necessary for the contact list search "SEARCH-CONTACT".

Figure 28:
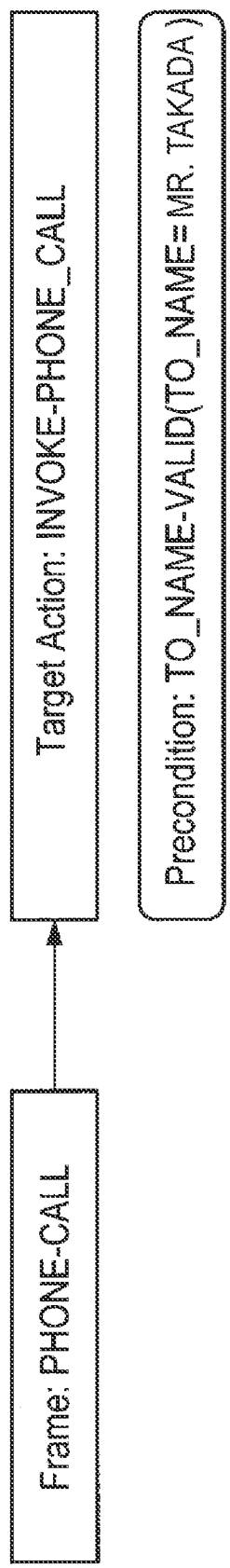
FIG. 28 is a diagram illustrating a case in which an address is valid.

FIG. 28 is a diagram illustrating a case in which an address is valid. FIG. 28 illustrates an example in which a user speaks "I want to make a phone call to Mr. Takada". In this case, the phone call making action "INVOKE-PHONE_CALL" is detected from the action for making a phone call "Frame: PHONE-CALL". Next, to execute the phone call making action "INVOKE-PHONE_CALL", it is necessary to satisfy the condition "TO-NAME-VALID" that the address is valid. In this case, since it is detected that the address is Mr. Takada, this condition is satisfied.

Figure 29:
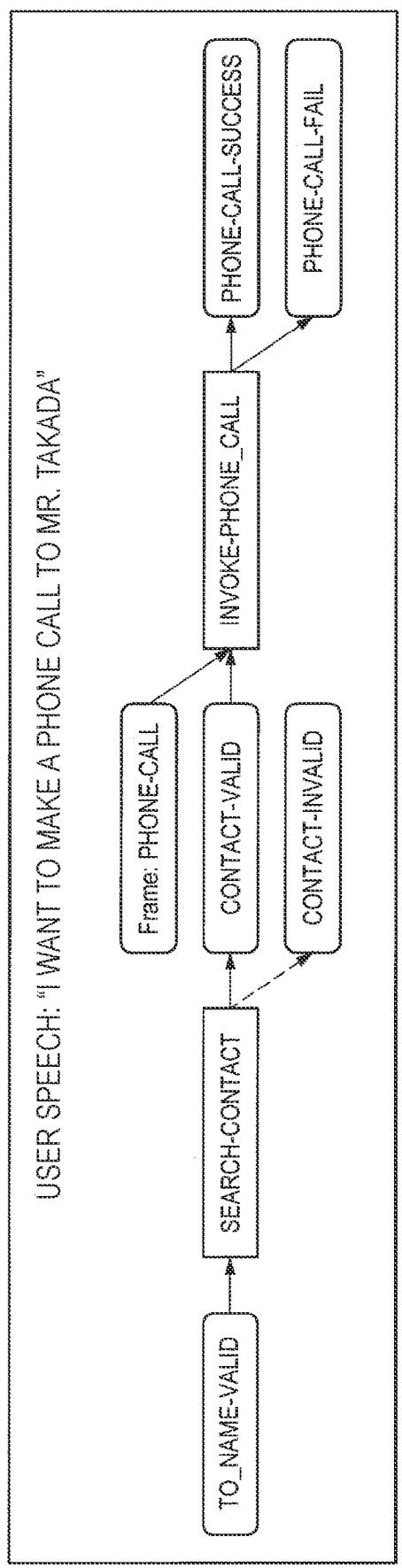
FIG. 29 is a diagram illustrating a planning example in the case where an address is valid.
Figure 30:
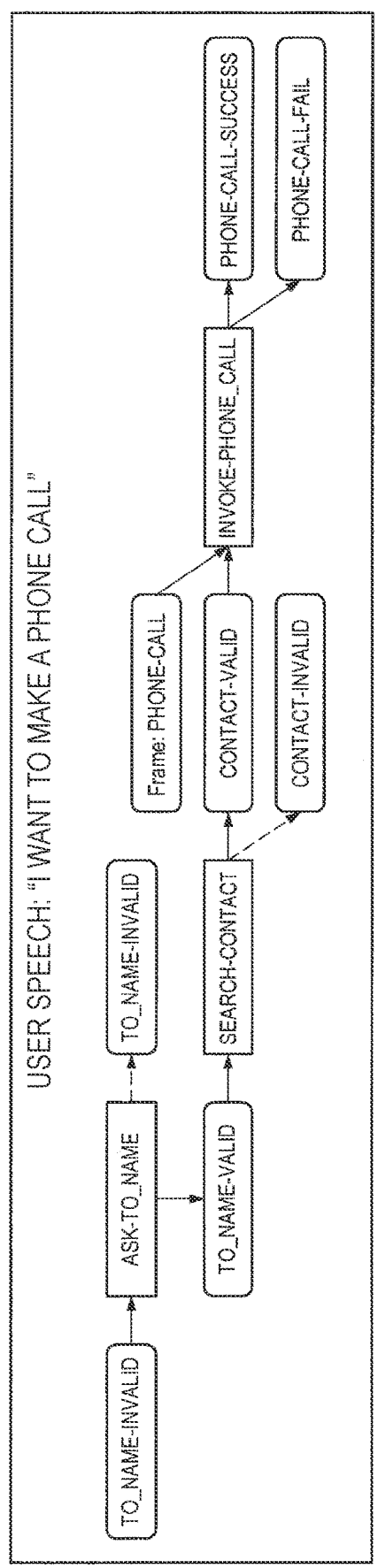
FIG. 30 is a diagram illustrating a planning example in the case where an address is invalid.

FIG. 29 is a diagram illustrating a planning example in the case where an address is valid. In addition, FIG. 30 is a diagram illustrating a planning example in the case where an address is invalid. FIG. 30 illustrates the example in which a user speaks "I want to make a phone call". This means that the address is not obtained from the speech of the user. In this case, to satisfy the condition "TO-NAME-VALID" that the address is valid, it is necessary to perform name check "ASK_TO_NAME" that asks the user about a name of a contact partner, as illustrated in FIG. 30.

[1.4. Hardware Configuration Example]

Figure 31:
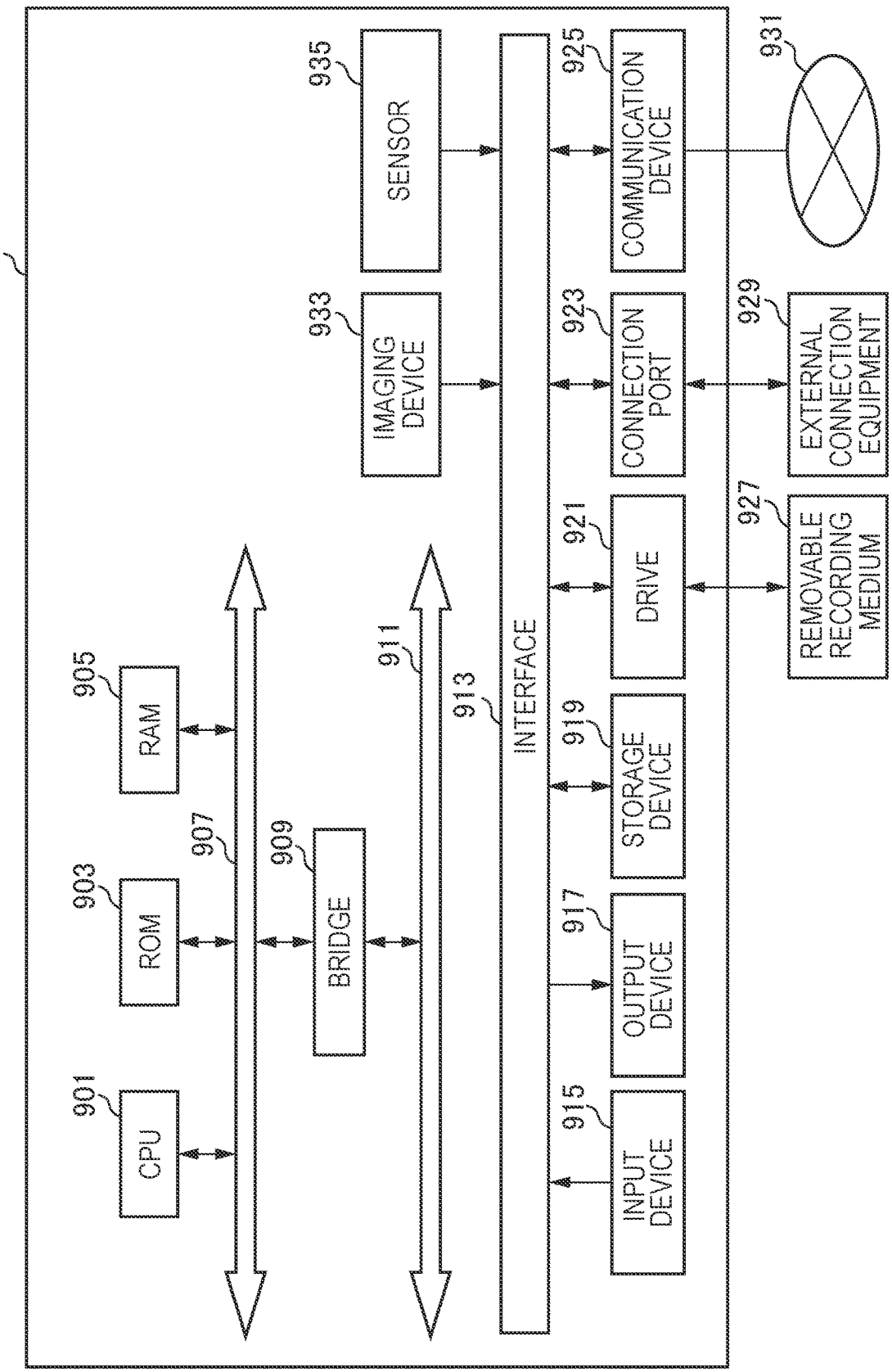
FIG. 31 is a block diagram illustrating a hardware configuration example of the information processing device.

Next, with reference to FIG. 31, a hardware configuration of an information processing device 10 according to the embodiment of the present disclosure will be described. FIG. 31 is a block diagram illustrating a hardware configuration example of the information processing device 10 according to the embodiment of the present disclosure.

As illustrated in FIG. 31, the information processing device 10 includes a central processing unit (CPU) 901, read only memory (ROM) 903, and random access memory (RAM) 905. In addition, the information processing device 10 may include a host bus 907, a bridge 909, an external bus 911, an interface 913, an input device 915, an output device 917, a storage device 919, a drive 921, a connection port 923, and a communication device 925. Moreover, the information processing device 10 may include an imaging device 933 and a sensor 935, as necessary. The information processing device 10 may include a processing circuit such as a digital signal processor (DSP) or an application specific integrated circuit (ASIC), instead of or in addition to the CPU 901.

The CPU 901 functions as an arithmetic processing device and a control device, and controls the overall operation or a part of the operation of the information processing device 10 in accordance with various programs recorded on the ROM 903, the RAM 905, the storage device 919, or a removable recording medium 927. The ROM 903 stores programs, operation parameters, and the like used by the CPU 901. The RAM 905 temporarily stores programs used when the CPU 901 is executed, and various parameters that change as appropriate when executing such programs. The CPU 901, the ROM 903, and the RAM 905 are connected with each other via the host bus 907 including an internal bus such as a CPU bus or the like. In addition, the host bus 907 is connected with the external bus 911 such as a Peripheral Component Interconnect/Interface (PCI) bus via the bridge 909.

The input device 915 is a device operated by a user such as a mouse, a keyboard, a touch panel, a button, a switch, or a lever. The input device 915 may include a microphone configured to detect voice of users. The input device 915 may be a remote control device that uses, for example, infrared radiation and another type of radio waves. Alternatively, the input device 915 may be external connection equipment 929 such as a mobile phone that corresponds to an operation of the information processing device 10. The input device 915 includes an input control circuit that generates input signals on the basis of information which is input by a user to output the generated input signals to the CPU 901. A user inputs various types of data and indicates a processing operation to the information processing device 10 by operating the input device 915. In addition, the imaging device 933 (to be described later) may function as the input device by capturing an image of movement of hands of a user or capturing an image of a finger of a user. At this time, a pointing position may be decided in accordance with the movement of the hands or the direction of the finger.

The output device 917 includes a device that can visually or aurally notify a user of acquired information. The output device 917 may be, for example, a display device such as a liquid crystal display (LCD), a plasma display panel (PDP), an organic electro-luminescence (EL) display, or a projector, a hologram display device, an audio output device such as a speaker or a headphone, or a printer. The output device 917 outputs a result obtained through a process performed by the information processing device 10, in the form of video such as text and an image, or sounds such as voice and audio sounds. In addition, the output device 917 may include a light or the like to light the surroundings.

The storage device 919 is a device for data storage that is an example of a storage unit of the information processing device 10. The storage device 919 includes, for example, a magnetic storage device such as a hard disk drive (HDD), a semiconductor storage device, an optical storage device, or a magneto-optical storage device. The storage device 919 stores programs and various kinds of data to be executed by the CPU 901, and various kinds of data acquired from the outside.

The drive 921 is a reader/writer for the removable recording medium 927 such as a magnetic disk, an optical disc, a magneto-optical disk, and a semiconductor memory, and built in or externally attached to the information processing device 10. The drive 921 reads out information recorded on the mounted removable recording medium 927, and outputs the information to the RAM 905. In addition, the drive 921 writes the record into the mounted removable recording medium 927.

The connection port 923 is a port used to directly connect equipment to the information processing device 10. The connection port 923 may be a USB (Universal Serial Bus) port, an IEEE1394 port, and a Small Computer System Interface (SCSI) port, or the like, for example. In addition, the connection port 923 may be an RS-232C port, an optical audio terminal, an HDMI (registered trademark) (High-Definition Multimedia Interface) port, or the like. The connection of the external connection equipment 929 with the connection port 923 makes it possible to exchange various kinds of data between the information processing device 10 and the external connection equipment 929.

The communication device 925 is a communication interface including, for example, a communication device for connection to a communication network 931. The communication device 925 may be, for example, a wired or wireless local area network (LAN), Bluetooth (registered trademark), or a communication card for a wireless USB (WUSB), in addition, the communication device 925 may also be a router for optical communication, a router for asymmetric digital subscriber line (ADSL), a modem for various types of communication, or the like. For example, the communication device 925 transmits and receives signals in the Internet or transmits signals to and receives signals from another piece of communication equipment by using a predetermined protocol such as TCP/IP. The communication network 931 to which the communication device 925 connects is a network established through wired or wireless connection. The communication network 931 is, for example, the Internet, a home LAN, infrared communication, radio wave communication, or satellite communication.

The imaging device 933 is a device configured to capture images of a real space by using an image sensor such as a charge coupled device (CCD) or a complementary metal oxide semiconductor (CMOS), and various members such as a lens for controlling image formation of a subject image onto the image sensor, and generates the captured images. The imaging device 933 may capture still images or moving images.

The sensor 935 is various sensors such as a ranging sensor, an acceleration sensor, a gyro sensor, a geomagnetic sensor, an optical sensor, and a sound sensor, for example. The sensor 935 acquires information regarding a state of the information processing device 10 itself such as a posture of a housing of the information processing device 10, and information regarding an environment surrounding the information processing device 10 such as luminous intensity and noise around the information processing device 10. The sensor 935 may include a global positioning system (GPS) sensor that receives GPS signals to measure latitude, longitude, and altitude of the device.

2. CONCLUSION

As described above, according to the embodiment of the present disclosure, there is provided an information processing device including: a text data analysis unit configured to analyze text data corresponding to dialogue using a natural language, and extract an event included in the text data and a process to be executed in accordance with the event; and a record control unit configured to record a correspondence relation between the event and the process on a recording medium as a program. According to the configuration, it is possible to easily record a program for obtaining an intention of a user from the text data corresponding to the dialogue using the natural language.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the example of detecting an event through structural analysis and morphological analysis has been described above. When the agent is capable of detecting events in such a way, it is expected that the agent also becomes capable of detecting context. When the agent is capable of detecting context, there is a possibility that the agent talks to a user by using the detected context as a start point.

In addition, it is also considered that basic knowledge (such as knowledge related to temperature, weather, and the like) is given to the agent. For example, it is considered that basic user feelings are given to the agent such as "temperature of 28° C. or more means hot" "temperature of 15° C. or less means cold", "users hate drying" "rain means sad", and "users hate pollens". This enables the agent to tune its functions such that the functions match a user that the agent stays together.

In addition, it is also possible to create a computer program for causing hardware such as CPU, ROM, and RAM, which are embedded in a computer, to execute functions equivalent to the functions of the control unit 120. Moreover, it may be possible to provide a computer-readable recording medium having the program recorded thereon.

Note that, the positions of the respective structural elements are not specifically limited as long as the above-described operation of the information processing device 10 is achieved. As a specific example, the text data generation unit 121, the text data analysis unit 122, and the like may be provided in a server (not illustrated) connected via a communication network 931. In other words, the information processing device 10 may be implemented by using so-called cloud computing. In this case, the information processing device 10 corresponds to a client connected with the server via the communication network 931. The text data generation unit 121, the text data analysis unit 122, and the like may be installed in different servers. Alternatively, one of the text data generation unit 121 and the text data analysis unit 122 may be installed in the server, and the other of the text data generation unit 121 and the text data analysis unit 122 may be installed in hardware of the client. Alternatively, the information processing device 10 may be implemented by the text data generation unit 121 and the text data analysis unit 122 that are installed in the server, and the information processing device 10 does not have to include the other structural elements.

In addition, in the case where the information processing device 10 is capable of handling a new event, it is possible to check with the user to see if the user wants the information processing device 10 to do something when an event occurs. For example, in the case where the information processing device 10 becomes capable of generating an event "it started raining", the information processing device 10 may say "is there anything you want me to do when it starts raining?" to check with the user. The checking with the user may be made in any way. For example, the user may be asked a question through voice output or display, and an answer is acquired from the user through voice input or image capturing.

In addition, it is also possible for the information processing device 10 to add a condition to a program after once registering a correspondence relation between an event and a process in the storage unit 130 as a program. For example, it is assumed that the user inputs an instruction "please turn on the air conditioner only in the case where there is a person" (by voice, for example) in a state in which a correspondence relation between an event "when temperature becomes 29° C." and a process of "turning on the air conditioner" has already been recorded on the storage unit 130 as a program. In this case, the information processing device 10 adds a condition to a program such that the process of "turning on the air conditioner" is executed in the case where the event "when temperature becomes 29° C." occurs and the condition that "there is a person" is satisfied.

Note that, the embodiment also includes the information processing device 10 from which the structural elements other than the record control unit 123 are omitted. In other words, it is only necessary to configure the record control unit 123 such that the recording medium records an event and a process (that are text data) in association with each other as a program, the event and process being extracted in advance by analyzing text data corresponding to dialogue using a natural language.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing device including:
a text data analysis unit configured to analyze text data corresponding to dialogue using a natural language, and extract an event included in the text data and a process to be executed in accordance with the event; and
a record control unit configured to record a correspondence relation between the event and the process on a recording medium as a program.

(2)
The information processing device according to (1),
in which the event and the process are extracted with reference to the event and the process that are recorded in advance on the recording medium.

(3)
The information processing device according to (1) or (2), including
an execution control unit configured to
control execution of a first process when occurrence of a first event is detected in a case where a first program corresponding to the first event is recorded,
control execution of a second process when occurrence of a second event is detected in a case where a second program corresponding to the second event is recorded, and
control automatic execution of the second process corresponding to the first process in a case where the execution of the first process corresponds to the occurrence of the second event.

(4)
The information processing device according to (1) or (2), including
an execution control unit configured to
control execution of a third process when occurrence of a third event is detected in a case where a third program corresponding to the third event is recorded,
control execution of a fourth process when occurrence of a fourth event is detected in a case where a fourth program corresponding to the fourth event is recorded, and
control automatic execution of the third process and the fourth process when at least one of the third event and the fourth event occurs in a case where the third event and the fourth event are an identical event.

(5)
The information processing device according to any one of (1) to (4),
in which the record control unit records a correspondence relation between a fifth event and a fifth process on a recording medium as a fifth program in a case where it is detected that the fifth process is performed within a predetermined period of time after occurrence of the fifth event.

(6)
The information processing device according to (5),
in which the record control unit checks with a user whether to perform the fifth process in response to the occurrence of the fifth event on a basis of the recorded fifth program.

(7)
The information processing device according to any one of (1) to (6),
in which the record control unit records a correspondence relation between a sixth event and a sixth process on a recording medium as a sixth program in a case where it is detected that the sixth process is performed at predetermined or higher frequency after occurrence of the sixth event.

(8)
The information processing device according to (7),
in which the record control unit checks with a user whether to perform the sixth process in response to the occurrence of the sixth event on a basis of the recorded sixth program.

(9)
The information processing device according to any one of (1) to (8), in which, when acquiring an instruction to record the correspondence relation on the recording medium as the program, the record control unit notifies a user that the program instructed to be recorded is already recorded in a case where a substantially corresponding program is already recorded on the recording medium.

(10)

The information processing device according to any one of (1) to (9), in which, when acquiring an instruction to record the correspondence relation on the recording medium as a program, the record control unit notifies a user that it is impossible to execute at least a part of a process included in the instruction in a case where at least one of equipment and an application for performing the process is not detected.

(11)

The information processing device according to (10), in which, in the case where at least one of the equipment and the application for performing the process is not detected, the record control unit proposes acquisition of the equipment and the application for performing the process.

(12)

The information processing device according to any one of (1) to (11), in which, in a case of detecting a plurality of objects that are objects included in at least one of the event and the process extracted from the text data, the record control unit decides the object included in at least one of the event and the process on a basis of at least one of an attribute of a user and a place where the text data is acquired.

(13)

The information processing device according to any one of (1) to (12), in which, to record the program on a recording medium, the record control unit automatically records a recovery program for recovering the process on the recording medium when the event included in the text data ends.

(14)

The information processing device according to (13), in which the record control unit automatically records the recovery program on the recording medium only in a case where permission to record the recovery program on the recording medium is acquired from a user.

(15)

The information processing device according to any one of (1) to (14), in which the text data is acquired from a detected voice of a user.

(16)

The information processing device according to any one of (1) to (15), including a presentation control unit configured to simplify the program recorded on the recording medium by using at least one of text and a diagram, and present the simplified program to a user.

(17)

The information processing device according to any one of (1) to 16, in which the text data analysis unit extracts the event and the process and generates the program on a basis of at least one of prescribed information and machine learning.

(18)

The information processing device according to any one of (1) to (17), in which the text data analysis unit extracts a condition of the event by analyzing the text data, and records the condition of the event on the recording medium in association with the program indicating the correspondence relation between the event and the process.

(19)

The information processing device according to (18), in which, in a case where it is impossible to extract the condition of the event from the analyzed text data, the text data analysis unit requests a user to present the condition of the event that is necessary for generating the program indicating the correspondence relation between the event and the process.

(20)

The information processing device according to any one of (1) to (19), in which the event includes at least any one of a speech from a user, predetermined change in an environment, detection of a predetermined signal performed by a sensor, and operation of predetermined equipment.

(21)

The information processing device according to any one of (1) to (20), in which the process includes at least any one of operation performed on predetermined equipment, operation performed on a predetermined medium, and execution of a predetermined application.

(22)

The information processing device according to any one of (1) to (21), in which the information processing device is an agent configured to control automatic execution of the process when the event occurs, on a basis of a program corresponding to analysis of text data generated from a voice of a user.

(23)

An information processing method including: by a processor, analyzing text data corresponding to dialogue using a natural language, and extracting an event included in the text data and a process to be executed in accordance with the event; and recording a correspondence relation between the event and the process on a recording medium as a program.

(24)

A program causing a computer to function as an information processing device including a text data analysis unit configured to analyze text data corresponding to dialogue using a natural language, and extract an event included in the text data and a process to be executed in accordance with the event, and a record control unit configured to record a correspondence relation between the event and the process on a recording medium as a program.

REFERENCE SIGNS LIST 10 information processing device
111 sound output unit
113 sound collection unit
114 imaging unit
115 distance detection unit
120 control unit
121 text data generation unit
122 text data analysis unit
123 record control unit
124 presentation control unit
126 event occurrence detection unit
127 execution control unit
130 storage unit
140 communication unit 150 display unit
20 control target equipment
230 storage unit

The invention claimed is:

1. An information processing device including at least a head and an eye, the information processing device comprising:
 a text data analysis unit configured to analyze text data corresponding to dialogue using a natural language, and extract an event included in the text data and a process to be executed in accordance with the event, wherein the execution of the process is associated with an animation resulted from a movement of the head and the eye;
 a record control unit configured to record a correspondence relation between the event and the process; and
 an execution control unit configured to
  control execution of a first process when occurrence of a first event is detected in a case where a first correspondence relation corresponding to the first event is recorded,
  control execution of a second process when occurrence of a second event is detected in a case where a second correspondence relation corresponding to the second event is recorded, and
  control, based on at least one of the first event and the second event occurring in a case where the first event and the second event are events identical to events recorded in advance, automatic execution of the first process and the second process,
 wherein the text data analysis unit, the record control unit, and the execution control unit are each implemented via at least one processor.

2. The information processing device according to claim 1,
 wherein the execution control unit is further configured to control, when at least one of the first event and the second event occurs in a case where the first event and the second event are an event identical to an event recorded in advance, automatic execution of the first process and the second process in parallel.

* * * * *